US011863340B2

(12) United States Patent
Jun et al.

(10) Patent No.: US 11,863,340 B2
(45) Date of Patent: Jan. 2, 2024

(54) METHOD AND SYSTEM FOR CONTROLLING HOME APPLIANCE

(71) Applicant: SAMSUNG ELECTRONICS CO., LTD., Suwon-si (KR)

(72) Inventors: Joonsik Jun, Suwon-si (KR); Heungryong Oh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/944,808

(22) Filed: Sep. 14, 2022

(65) Prior Publication Data

US 2023/0083403 A1   Mar. 16, 2023

Related U.S. Application Data

(63) Continuation of application No. PCT/KR2022/013672, filed on Sep. 14, 2022.

(30) Foreign Application Priority Data

Sep. 14, 2021   (KR) .................. 10-2021-0122773

(51) Int. Cl.
*H04L 12/28* (2006.01)
*H04W 4/80* (2018.01)
(Continued)

(52) U.S. Cl.
CPC ...... *H04L 12/2809* (2013.01); *H04L 12/2827* (2013.01); *H04W 4/023* (2013.01);
(Continued)

(58) Field of Classification Search
CPC ............. H04L 12/2809; H04L 12/2827; H04L 2012/2841; H04W 4/80; H04W 4/023; H04W 84/18
(Continued)

(56) References Cited

U.S. PATENT DOCUMENTS 8,548,519 B2   10/2013  Onozawa
8,600,295 B2   12/2013  Rappaport
(Continued)

FOREIGN PATENT DOCUMENTS

CN      210042235 U    2/2020
JP      2007-158447 A  6/2007
(Continued)

OTHER PUBLICATIONS

MQTT-Based Surveillance System of IoT Using UWB Real Time Location System Norrdine et al. International Conferences on Internet of Things (iThings) and IEEE Green Computing 2020 (pp. 216-221).*

(Continued)

*Primary Examiner* — Tauqir Hussain
(74) *Attorney, Agent, or Firm* — Sughrue Mion, PLLC

(57) ABSTRACT

A method of controlling a home appliance includes receiving a distance measurement request signal from a user equipment; transmitting, based on the received distance measurement request signal, an ultra-wideband (UWB) communication module activation signal to the user equipment and a second home appliance that includes a UWB antenna; receiving, from the second home appliance, a location measurement value of the user equipment measured with respect to the second home appliance, the location measurement value being based on a UWB signal between the user equipment and the second home appliance; determining location information about the user equipment, based on the location measurement value of the user equipment; receiving, from a first home appliance that does not include a UWB antenna, information about the first home appliance; and registering the first home appliance in the server device, based on the received information about the (Continued)

first home appliance and the location information about the user equipment.

20 Claims, 24 Drawing Sheets

(51) Int. Cl.
  *H04W 4/02* (2018.01)
  *H04W 84/18* (2009.01)
(52) U.S. Cl.
  CPC ....... *H04W 4/80* (2018.02); *H04L 2012/2841* (2013.01); *H04W 84/18* (2013.01)
(58) Field of Classification Search
  USPC .......................................................... 709/223
  See application file for complete search history.

(56) References Cited

U.S. PATENT DOCUMENTS

| | | | | |
|---|---|---|---|---|
| 11,070,568 | B2* | 7/2021 | Ektare | H04L 43/10 |
| 11,082,296 | B2* | 8/2021 | Du | H04L 41/065 |
| 11,087,005 | B2* | 8/2021 | Cheng | H04L 63/0227 |
| 11,115,799 | B1* | 9/2021 | Du | H04L 63/205 |
| 11,394,729 | B2* | 7/2022 | Verma | H04L 63/1433 |
| 11,405,778 | B2* | 8/2022 | Omsberg | H04W 12/63 |
| 11,451,571 | B2* | 9/2022 | Du | H04L 63/20 |
| 2016/0149716 | A1* | 5/2016 | Raj | H04L 12/2827 700/275 |
| 2016/0150298 | A1* | 5/2016 | Kim | H04Q 9/00 340/870.02 |
| 2016/0233678 | A1* | 8/2016 | Tuller | D06F 33/46 |
| 2017/0195318 | A1* | 7/2017 | Liu | H04L 67/10 |
| 2018/0295148 | A1* | 10/2018 | Mayorgo | H04L 63/20 |
| 2019/0255893 | A1* | 8/2019 | Van Wiemeersch | B60C 23/0479 |
| 2019/0289648 | A1* | 9/2019 | Kim | H04W 8/26 |
| 2019/0357339 | A1* | 11/2019 | Kim | H05B 47/105 |
| 2020/0322177 | A1* | 10/2020 | Kim | G05B 19/042 |
| 2021/0106134 | A1* | 4/2021 | Deng | A47B 9/10 |
| 2021/0320681 | A1 | 10/2021 | Baek et al. | |
| 2022/0001836 | A1 | 1/2022 | Baek et al. | |
| 2023/0231591 | A1* | 7/2023 | Russell | H04B 1/38 455/552.1 |

FOREIGN PATENT DOCUMENTS

| | | |
|---|---|---|
| KR | 10-1745709 B1 | 6/2017 |
| KR | 10-1902715 B1 | 9/2018 |
| KR | 10-2019-0066141 A | 6/2019 |
| KR | 10-2003797 B1 | 8/2019 |
| KR | 10-2019-0115513 A | 10/2019 |
| KR | 10-2060815 B1 | 12/2019 |
| KR | 10-2072097 B1 | 1/2020 |
| KR | 10-2020-0049269 A | 5/2020 |
| KR | 10-2521850 B1 | 4/2023 |
| KR | 10-2551302 B1 | 7/2023 |

OTHER PUBLICATIONS

Norrdine, Abdelmoumen, et al., "MQTT-Based Surveillance System of IoT Using UWB Real", 2020 International Conferences on Internet of Things (iThings) and IEEE Green Computing and Communications (GreenCom) and IEEE Cyber, Physical and Social Computing (CPSCom) and IEEE Smart Data (SmartData) and IEEE Congress on Cybermatics (Cybermatics), Nov. 2, 2020, pp. 216-221. (7 pages total).

Lee, Youngjae et al., "IoT-based data transmitting system using a UWB and RFID system in smart warehouse", 2017 Ninth International Conference on Ubiquitous and Future Networks (ICUFN), Jul. 4, 2017, pp. 545-547. (4 pages total).

Ling, Rejina Wei Choi, et al., "High precision UWB-IR indoor positioning system for IoT applications", 2018 IEEE 4th World Forum on Internet of Things (WF-oT), Feb. 5, 2018, pp. 135-139. (6 pages total).

International Search Report and Written Opinion dated Dec. 28, 2022 by the International Searching Authority in International Patent Application No. PCT/KR2022/013672. (PCT/ISA/220, PCT/ISA/210 & PCT/ISA/237).

Xiaomi, "Introducing Xiaomi UWB Technology", 2020, https://www.youtube.com/watch?v=DGBxL3Ndhww(0:23-1:25 & screen shot).

* cited by examiner

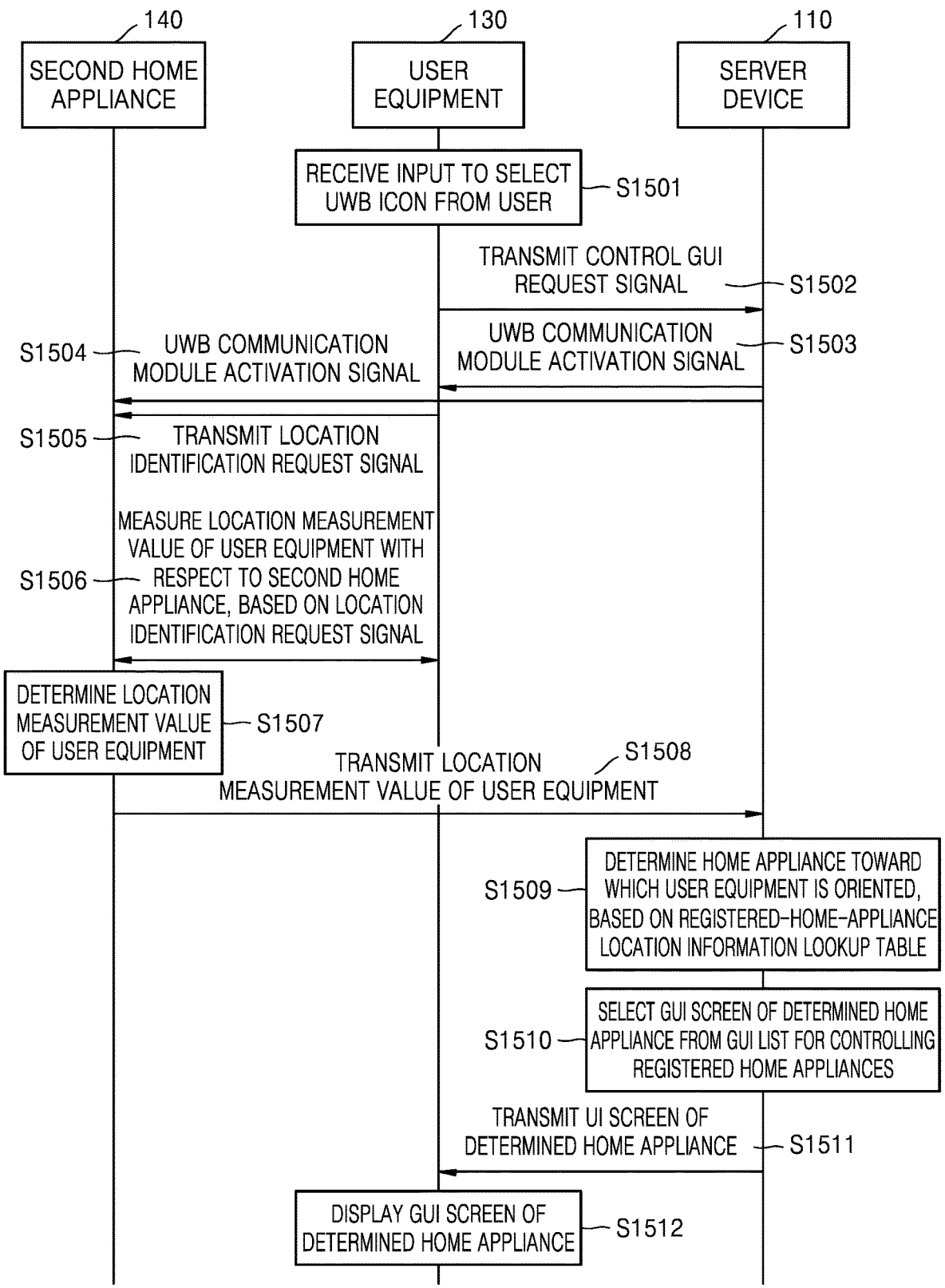

METHOD AND SYSTEM FOR
CONTROLLING HOME APPLIANCE

CROSS-REFERENCE TO RELATED
APPLICATION

This application is a bypass continuation application of International Application No. PCT/KR2022/013672, filed Sep. 14, 2022, which claims priority to Korean Patent Application No. 10-2021-0122773, filed on Sep. 14, 2021, in the Korean Intellectual Property Office, the disclosures of which are incorporated by reference herein in their entireties.

BACKGROUND

1. Field

The disclosure relate to a method and system for controlling an in-house home appliance by using location information about a user equipment, which is obtained through a home appliance including an ultra-wideband (UWB) communication module.

2. Description of Related Art

With the widespread use of Internet of Things (IoT) products, people's lives have improved as objects around them are connected to the Internet. However, many types of IoT products do not often include ultra-wideband (UWB) communication modules as smartphones do, and thus, there is a problem in accurately measuring locations of the IoT products without UWB modules. Thus, when such an IoT product is registered in a server, a user input to set a location of the IoT product has to be received from a user, resulting user inconvenience.

SUMMARY

Embodiments of the disclosure provide a server device, a control method of the server device, and a control method of a user equipment to address a difficulty caused by failing to accurately measure a location of a home appliance that does not include a ultra-wideband (UWB) communication module, and to solve a problem in terms of user convenience in a process of connecting a home appliance in a state of a new product before network connection to a network and registering the home appliance in a server.

According to an aspect of the disclosure, a method, performed by a server device, of controlling a home appliance, includes: receiving a distance measurement request signal from a user equipment; transmitting, based on the received distance measurement request signal, an ultra-wideband (UWB) communication module activation signal to the user equipment and a second home appliance that includes a UWB antenna; receiving, from the second home appliance, a location measurement value of the user equipment measured with respect to the second home appliance, the location measurement value being based on a UWB signal between the user equipment and the second home appliance; determining location information about the user equipment, based on the location measurement value of the user equipment; receiving, from a first home appliance that does not include a UWB antenna, information about the first home appliance; and registering the first home appliance in the server device, based on the received information about the first home appliance and the location information about the user equipment.

The method may further include identifying, based on the received distance measurement request signal, the second home appliance as an appliance including the UWB antenna and being registered in the server device.

The distance measurement request signal may be transmitted from the user equipment to the server device based on a selection of a quick response (QR) capturing menu or a near field communication (NFC) tagging menu on a device registration graphical user interface (GUI) displayed on the user equipment to register the first home appliance.

The receiving the location measurement value of the user equipment may include receiving location information about the user equipment measured with respect to the second home appliance based on a location identification request signal, and the location identification request signal may be a UWB signal transmitted from the user equipment to the second home appliance based on selection of a QR capturing button of the user equipment or performing NFC tagging with the user equipment.

The location measurement value may include azimuth information about the user equipment, measured with respect to the second home appliance, elevation information about the user equipment, measured with respect to the second home appliance, and distance information between the second home appliance and the user equipment.

The determining the location information about the user equipment may include determining the location information about the user equipment based on a comparison of information in a location information lookup table stored in the server device with the location measurement value of the user equipment.

The receiving the information about the first home appliance may include receiving, based on access point (AP) information received by the first home appliance from the user equipment, the information about the first home appliance from the first home appliance through a Wireless Fidelity (WiFi) communication channel established between the user equipment and the first home appliance.

The information about the first home appliance may include a product name of the first home appliance, a manufacturing date of the first home appliance, and state information about the first home appliance.

The method may further include: receiving a control graphical user interface (GUI) request signal from the user equipment; based on the received control GUI request signal, transmitting the UWB communication module activation signal to the user equipment and the second home appliance; receiving, from the second home appliance, the location measurement value of the user equipment measured in response to a location identification request signal transmitted from the user equipment; determining a third home appliance toward which the user equipment is oriented, based on the location measurement value of the user equipment; and providing a GUI for controlling the determined third home appliance to the user equipment.

According to an aspect of the disclosure, a server device includes: a communication interface configured to communicate with a user equipment and at least one home appliance; a memory storing one or more instructions; and at least one processor configured to execute the one or more instructions to: receive, via the communication interface, a distance measurement request signal from a user equipment; control the communication interface to transmit, based on the received distance measurement request signal, an ultra-wideband (UWB) communication module activation signal to the user equipment and a second home appliance that includes a UWB antenna; receive, from the second home appliance via the communication interface, a location measurement value of the user equipment measured with respect to the second home appliance, the location measurement value being based on a UWB signal between the user equipment and the second home appliance; determine location information about the user equipment, based on the location measurement value of the user equipment; receive, from a first home appliance that does not include a UWB antenna, information about the first home appliance; and register the first home appliance in the server device, based on the received information about the first home appliance and the location information about the user equipment.

The at least one processor may be further configured to execute the one or more instructions to identify, based on the received distance measurement request signal, the second home appliance as an appliance including the UWB antenna and being registered in the server device.

The distance measurement request signal may be transmitted from the user equipment to the server device, based on a selection of a quick response (QR) capturing menu or a near field communication (NFC) tagging menu on a device registration graphical user interface (GUI) displayed on the user equipment to register the first home appliance.

The at least one processor may be further configured to execute the one or more instructions to receive the location measurement value of the user equipment by receiving location information about the user equipment measured with respect to the second home appliance based on a location identification request signal, and the location identification request signal may be a UWB signal transmitted from the user equipment to the second home appliance based on selecting selection of a QR capturing button of the user equipment or performing NFC tagging with the user equipment.

The location measurement value may include azimuth information about the user equipment, measured with respect to the second home appliance, elevation information about the user equipment, measured with respect to the second home appliance, and distance information between the second home appliance and the user equipment.

The at least one processor may be further configured to execute the one or more instructions to determine the location information about the user equipment based on a comparison of information in a location information lookup table stored in the server device with the location measurement value of the user equipment.

The at least one processor may be further configured to execute the one or more instructions to receive the information about the first home appliance by receiving, based on access point (AP) information received by the first home appliance from the user equipment, the information about the first home appliance from the first home appliance through a Wireless Fidelity (WiFi) communication channel established between the user equipment and the first home appliance.

The information about the first home appliance may include a product name of the first home appliance, a manufacturing date of the first home appliance, and state information about the first home appliance.

The at least one processor may be further configured to execute the one or more instructions to: receive, via the communication interface, a control graphical user interface (GUI) request signal from the user equipment; control the communication interface to transmit the UWB communication module activation signal to the user equipment and the second home appliance, based on the received control GUI request signal; receive, from the second home appliance via the communication interface, the location measurement value of the user equipment measured in response to a location identification request signal transmitted from the user equipment; determine a third home appliance toward which the user equipment is oriented, based on the location measurement value of the user equipment; and control the communication interface to provide a graphical user interface (GUI) for controlling the determined third home appliance to the user equipment.

According to an aspect of the disclosure, a non-transitory computer-readable recording medium has recorded thereon a computer program that is executable by a computer to perform the method.

According to an aspect of the disclosure, a method of controlling a user equipment, includes: receiving a user input to select a quick response (QR) capturing menu or a near field communication (NFC) tagging menu on a device registration graphical user interface (GUI) displayed on the user equipment; transmitting a distance measurement request signal to a server device, based on the received user input; transmitting a location identification request signal, to a second home appliance identified by the server device as registered and including a UWB antenna, based on a user of the user equipment selecting a QR capturing button of the user equipment or performing NFC tagging with the user equipment; receiving a user input to input access point (AP) information in the device registration GUI displayed on the user equipment; and transmitting the received AP information to a first home appliance identified by a QR capture or an NFC tag.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 15 is a sequence diagram illustrating a method, performed by a server device in cooperation with other devices, of providing a registered-home appliance control GUI to a user equipment, according to an embodiment of the disclosure;

DETAILED DESCRIPTION

Figure 1:
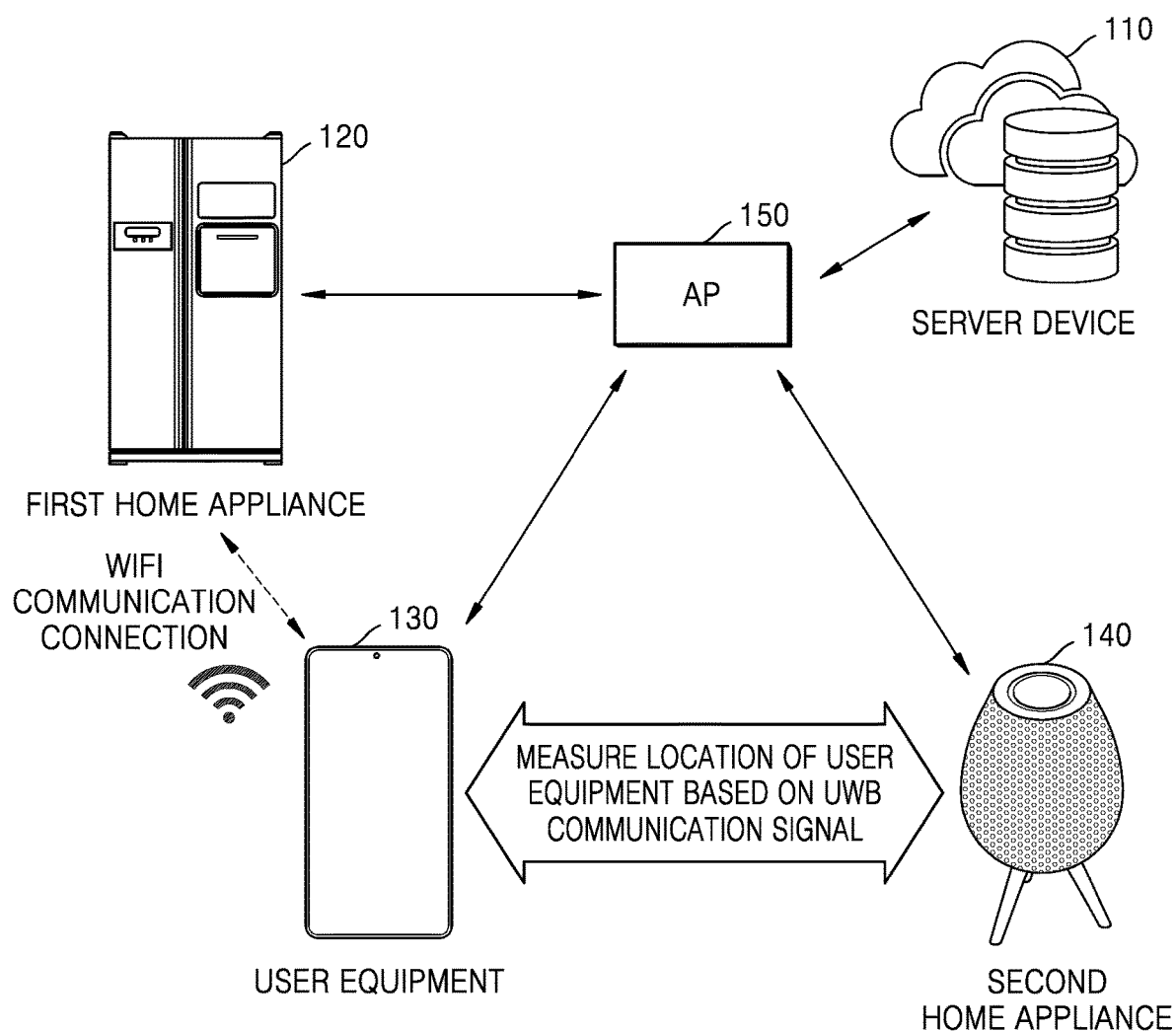
FIG. 1 is a diagram illustrating a system for controlling a home appliance according to an embodiment of the disclosure.

Throughout the disclosure, the expression "at least one of a, b or c" indicates any of: only a, only b, only c, both a and b, both a and c, both b and c, all of a, b, and c, or variations thereof.

Terms used herein will be described in brief, and the disclosed embodiments of the disclosure will be described in detail.

Although terms used in the disclosure are selected with general terms popularly used at present under the consideration of functions in the disclosure, the terms may vary according to the intention of those of ordinary skill in the art, judicial precedents, introduction of new technology, etc. In addition, in a specific case, the applicant voluntarily may select terms, and in this case, the meaning of the terms is disclosed in a corresponding description part of an embodiment of the disclosure. Thus, the terms used in the disclosure should be defined not by the simple names of the terms but by the meaning of the terms and the contents throughout the disclosure.

Throughout the entirety of the specification of the disclosure, when it is assumed that a certain part includes a certain component, the term 'including' means that a corresponding component may further include other components unless specially described to the contrary. The term used in the embodiments of the disclosure such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, an embodiment of the disclosure may be implemented in several different forms, and is not limited to the embodiment of the disclosure described herein. To clearly describe an embodiment of the disclosure, parts that are not associated with the description have been omitted from the drawings, and throughout the entire disclosure, identical reference numerals refer to identical parts.

The disclosure will primarily describe various components as "home appliances" or "appliances" as an example use case. However, it is noted that the principles disclosed within are broadly applicable to a variety of devices and are not limited to the contexts of appliances or residential homes.

FIG. 1 is a diagram illustrating a system for controlling a home appliance according to an embodiment of the disclosure.

Referring to FIG. 1, a system for controlling a home appliance (hereinafter, a home appliance control system) according to an embodiment of the disclosure may include a server device 110, a first home appliance 120, a user equipment 130, and a second home appliance 140. However, all the illustrated components are not essential components. A home appliance control system may be implemented by more components than the illustrated components or fewer components than the illustrated components.

The first home appliance 120 and the second home appliance 140, according to an embodiment of the disclosure, may communicate with the user equipment 130 through wireless fidelity (WiFi) communication. The first home appliance 120 and the second home appliance 140 may connect to the server device 110 through an access point (AP) device 150. The first home appliance 120 and the second home appliance 140 may perform WiFi communication with the AP device 150 and may connect to the server device 110 by connecting to the Internet through the AP device 150. The second home appliance 140, according to an embodiment of the disclosure, may be an ultra-wideband (UWB) device including a UWB communication module, and may measure a location of the user equipment 130 based on a UWB measurement signal. The first home appliance 120 according to an embodiment of the disclosure may not include a UWB communication module.

The first home appliance 120 may provide various functions while communicating with the user equipment 130 and the server device 110. For example, the first home appliance 120 may connect to the server device 110 and may be registered in the server device 110. The first home appliance 120 may provide various functions through an application executed on the user equipment 130. The application may operate in conjunction with the server device 110. The application may provide a function such as monitoring, control, automation, voice assistant, etc., of the first home appliance 120. When the first home appliance 120 is registered in the server device 110, it may mean that device information about the first home appliance 120 (a model name, a serial number, a manufacturing date, etc.), user account information about the first home appliance 120, network information about the first home appliance 120 (an Internet protocol (IP) address, etc.), and so forth are stored in the server device 110. Thus, on an application executed on the user equipment 130, a user logging in through a user account may transmit a control command for controlling the first home appliance 120 to the server device 110, and the server device 110 may transmit the control command to the first home appliance 120 based on the network information about the first home appliance 120.

To provide such an application function, the first home appliance 120 needs to be registered in the server device 110 and has to establish communication with the server device 110. The first home appliance 120 may not be able to provide an application function and various functions provided in the server device 110, in a new product state of not yet being registered in the server device 110 after release from a factory. Such a new product state may be referred to as an out-of-box (OOB) state.

As described above, the new product state may mean a state where the first home appliance 120 is not registered in the server device 110. To register the first home appliance 120 in the server device 110, the first home appliance 120 has to switch to a network connection mode to establish WiFi communication connection with the user equipment 130, and has to receive information for connection of the AP device 150 (a service set identifier (SSID) of the AP device 150, an ID of the AP device 150, a password, an authentication scheme, an encryption method, an authentication key, etc.) from the user equipment 130.

In this case, to switch the first home appliance 120 to the network connection mode for WiFi communication connection with the user equipment 130, it is necessary for the user to operate a button of the first home appliance 120. For example, when the first home appliance 120 is an air cleaner, the user may switch the air cleaner to the network connection mode to establish WiFi communication with the user equipment 130 by long pressing an air volume button of the air cleaner or long pressing a reservation button of a remote control of the air cleaner. In this case, a method to switch to the network connection mode varies from home appliance to home appliance, such that the user may in various cases capture a quick response (QR) code attached onto a surface of the first home appliance 120 using the user equipment 130 or perform near field communication (NFC) tagging by touching an NFC tag region of the first home appliance 120 using the user equipment 130, whereby the first home appliance 120 may obtain a guide to switch to the network connection mode.

In a general registration process of a home appliance, information (a product name, a product serial number, a manufacturing date, etc.) of the home appliance may be automatically transmitted to the server device 110, but a location of the home appliance may be designated by a user input. For example, when a home appliance is a refrigerator, a user input to set a location of the refrigerator as a "kitchen" may be required. In this case, a user input to designate a location of a home appliance is required, causing a problem in terms of user convenience and a difficulty in designating an exact location of the home appliance. When a home appliance to be registered includes a UWB communication module, a UWB signal may be received from another home appliance including the UWB communication module and an exact location of the home appliance to be registered may be measured based on the received UWB signal. However, in case of a home appliance without a UWB communication module, it is difficult to measure an exact location of the home appliance. Herein, the first home appliance 120 to be registered is assumed to be a home appliance without a UWB communication module.

Thus, according to an embodiment of the disclosure, a technique of utilizing the user equipment 130 including a UWB communication module and the second home appliance 140 including a UWB communication module to register the location of the first home appliance 120 without a UWB communication module is proposed.

In order for the user to register the first home appliance 120 in the server device 110, a process of communication connection between the user equipment 130 and the first home appliance 120 is required. The first home appliance 120 to which the user equipment 130 is to connect, and/or a type of the first home appliance 120, may be recognized by an action of capturing a QR code displayed on the first home appliance 120 by using the user equipment 130, or by an action of placing the user equipment 130 in adjacent to the NFC tag region of the first home appliance 120 to perform NFC tagging. Either such action requires that the user equipment 130 and the first home appliance 120 are to be located very close to each other during registration of the first home appliance 120. Thus, when the location of the user equipment 130 is measured, the location of the user equipment 130 may be registered as the location of the first home appliance 120.

According to an embodiment of the disclosure, the second home appliance 140 may include a UWB communication module, and the second home appliance 140 may be a home appliance already registered in the server device 110. According to an embodiment of the disclosure, the second home appliance 140 may serve as a reference point for measuring a relative location of the user equipment 130 located adjacent to the first home appliance 120, and thus may be secured in position due to a fixed location thereof in the house. For example, the second home appliance 140 may include, but is not limited to, an artificial intelligence (AI) speaker, an induction range, an illuminating device, etc.

According to an embodiment of the disclosure, to receive a guide for registering the first home appliance 120 in the server device 110, the user may capture the QR code displayed on the first home appliance 120 at a distance very close to the first home appliance 120, or may touch the user equipment 130 to an NFC tag region of the first home appliance 120 to perform NFC tagging. When the user selects a QR capturing button of the user equipment 130 or performs NFC tagging, a location identification request signal may be transmitted from the user equipment 130 to the second home appliance 140.

The second home appliance 140 according to an embodiment of the disclosure may measure a location of the user equipment 130 based on the received location identification request signal. The second home appliance 140 may measure a relative location measurement value of the user equipment 130 with respect to the second home appliance 140, based on a UWB signal that is the location identification request signal transmitted from a UWB antenna embedded in the user equipment 130. In this case, the location measurement value of the user equipment 130 may include azimuth information and elevation information about the user equipment 130 measured with respect to the second home appliance 140 and distance information about the user equipment 130 with respect to the second home appliance 140. That is, the second home appliance 140 may measure, as the location measurement value, coordinates at which the user equipment 130 is located in a spherical coordinate system having the second home appliance 140 as the origin.

The second home appliance 140 according to an embodiment of the disclosure may transmit the measured location measurement value of the user equipment 130 to the server device 110. The server device 110 according to an embodiment of the disclosure may determine location information about the user equipment 130 based on a registered location information lookup table of a home appliance (for brevity, hereinafter, a "lookup table"). The server device 110 according to an embodiment of the disclosure may have stored a lookup table including location information about a registered home appliance in the house and a location measurement value of the registered home appliance. For example, when an air conditioner in the house is registered in the server device 110, the lookup table may have stored a model name of the air conditioner, location information about the air conditioner (a "living room" where the air conditioner is installed), and a location measurement value of the air conditioner (coordinates at which the air conditioner is located with respect to the second home appliance 140).

The server device 110 according to an embodiment of the disclosure may compare the received location measurement value of the user equipment 130 with the location measurement value of the registered home appliance, included in the lookup table, to determine the location information about the user equipment 130. For example, when it is determined that the location measurement value of the user equipment 130 is most similar to the location measurement value of the registered air conditioner as a result of comparison between the location measurement value of the user equipment 130 and the lookup table, the location information about the user equipment 130 may be determined as the location information about the registered air conditioner. Thus, when the location information about the registered air conditioner is a "living room", the location information about the user equipment 130 may be determined as the "living room".

Together with a process, performed by the server device 110 according to an embodiment of the disclosure, of determining the location information about the user equipment 130, registration of the first home appliance 120 may be performed. When the user captures the QR code attached onto the surface of the first home appliance 120 to be registered, by using the user equipment 130, or performs NFC tagging by touching the user equipment 130 to the NFC tag region of the first home appliance 120, a registration guide of the first home appliance 120 may be displayed on the user equipment 130. According to an embodiment of the disclosure, when the first home appliance 120 switches to the network connection mode based on the registration guide and WiFi communication is established between the user equipment 130 and the first home appliance 120, information about the AP device 150 may be transmitted from the user equipment 130 to the first home appliance 120. The first home appliance 120 may connect to the server device 110 based on the received information about the AP device 150, and transmit information (a product name, a product serial number, a manufacturing date, etc.) of the first home appliance 120 to the server device 110. The first home appliance 120 may transmit user account information received from the user equipment 130 to the server device 110 to allow the server device 110 to store the user account information together.

The server device 110, according to an embodiment of the disclosure, may use, as the location information about the first home appliance 120, the location information about the user equipment 130 determined based on the location measurement value of the user equipment 130 transmitted from the second home appliance 140. The server device 110, according to an embodiment of the disclosure, may register the first home appliance 120 in the server device 110, based on the information about the first home appliance 120 transmitted from the first home appliance 120 and the location information about the first home appliance 120. The server device 110, according to an embodiment of the disclosure, may update the lookup table by matching the information about the first home appliance 120, the location information about the first home appliance 120, and the location measurement value of the first home appliance 120 (which is the same as the location measurement value of the user equipment 130).

According to an embodiment of the disclosure, in registration of the first home appliance 120, an exact location of which is difficult to measure because of absence of the UWB communication module therein, the location of the user equipment 130 located closest to the first home appliance 120 may be used as the location of the first home appliance 120. In this case, by using the UWB communication module included in the user equipment 130 and the UWB communication module included in the second home appliance 140, the location of the user equipment 130 may be accurately measured. Thus, the location of the first home appliance 120 including no UWB communication module may be accurately recognized by the server device 110.

Figure 2:
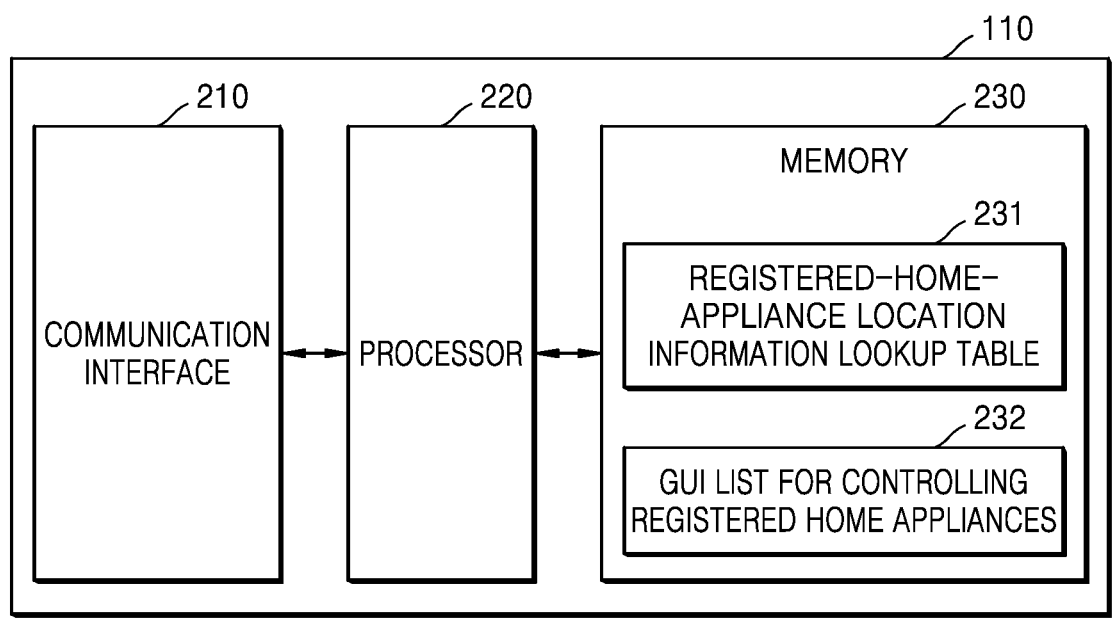
FIG. 2 is a block diagram illustrating a structure of a server device according to an embodiment of the disclosure.

FIG. 2 is a block diagram illustrating a structure of a server device according to an embodiment of the disclosure.

Referring to FIG. 2, the server device 110 may include a communication interface 210, a processor 220, and a memory 230. However, all the illustrated components are not essential components. The server device 110 may be implemented by more or less components than the illustrated components.

Hereinafter, the aforementioned components will be described sequentially.

The communication interface 210 may include one or more components that enable communication between the server device 110 and the first home appliance 120, between the server device 110 and the user equipment 130, or between the server device 110 and the second home appliance 140.

According to an embodiment of the disclosure, the communication interface 210 may receive a distance measurement request signal from the user equipment 130. The distance measurement request signal may be transmitted from the user equipment 130 to the server device 110 when a user input to select a QR capturing menu or an NFC tagging menu is received in a device registration graphical user interface (GUI) of the user equipment 130. The distance measurement request signal, according to an embodiment of the disclosure, may be a signal allowing the server device 110 to identify existence of a home appliance including a UWB communication module among registered home appliances in relation to a user account.

According to an embodiment of the disclosure, the communication interface 210 may transmit a UWB communication module activation signal to the user equipment 130 and the second home appliance 140 based on the received distance measurement request signal. The UWB communication module activation signal may induce activation of the UWB antennas respectively included in the user equipment 130 and the second home appliance 140 to induce a preparation stage for the second home appliance 140 to measure the location of the user equipment 130.

According to an embodiment of the disclosure, the communication interface 210 may receive a location identification request signal from the user equipment 130, and transmit the received location identification request signal to the second home appliance 140. The location identification request signal may be transmitted from the user equipment 130 to the server device 110 when the user presses the QR capturing button of the user equipment 130, or when the user touches the NFC tag region of the first home appliance 120 using the user equipment 130 to perform NFC tagging. The location identification request signal, according to an embodiment of the disclosure, may induce the second home appliance 140 to measure a location measurement value of the user equipment 130 based on a UWB signal transmitted from the UWB antenna of the user equipment 130.

According to an embodiment of the disclosure, the communication interface 210 may receive a location measurement value of the user equipment 130 from the second home appliance 140. In this case, the location measurement value of the user equipment 130 may include azimuth information and elevation information about the user equipment 130 with respect to the second home appliance 140 and distance information about the user equipment 130 with respect to the second home appliance 140.

According to an embodiment of the disclosure, the communication interface 210 may receive information about the first home appliance 120 from the first home appliance 120. The first home appliance 120 may receive information about the AP device 150 from the user equipment 130 in a registration process, and connect to the server device 110 based on the received information about the AP device 150, and transmit the information about the first home appliance 120 to the server device 110.

According to an embodiment of the disclosure, the communication interface 210 may receive a control GUI screen request signal from the user equipment 130. In this case, the control GUI screen request signal may request a control GUI screen of a home appliance toward which the user equipment 130 is oriented.

The processor 220 may control an overall operation of the server device 110 by using a program, an instruction, or information stored in the memory 230. The processor 220 may be implemented as one or more processors. The processor 220 may control an operation of components included in the server device 110.

According to an embodiment of the disclosure, the processor 220 may determine whether there is a home appliance including a UWB communication module among home appliances registered in the server device 110, based on the distance measurement request signal transmitted from the user equipment 130. The processor 220 may identify a home appliance having these qualities and designate it for use in later processes as the second home appliance 140.

According to an embodiment of the disclosure, the processor 220 may determine the location information about the user equipment 130, based on the location measurement value of the user equipment 130 transmitted from the second home appliance 140. The processor 220 may determine the location information about the user equipment 130 by using a registered-home-appliance location information lookup table 231 in the memory 230. According to an embodiment of the disclosure, the processor 220 may compare a location measurement value of a registered home appliance stored in the registered-home-appliance location information lookup table 231 with the location measurement value of the user equipment 130, in order to use location information about a registered home appliance, determined to be closest, as the location information about the user equipment 130.

According to an embodiment of the disclosure, the processor 220 may register the first home appliance 120 based on the information about the first home appliance 120 received from the first home appliance 120. As the location information about the first home appliance 120, the location information about the user equipment 130 may be used.

According to an embodiment of the disclosure, when the processor 220 receives the location measurement value of the user equipment 130 from the second home appliance 140 after receiving the control GUI request signal from the user equipment 130, the processor 220 may determine a third home appliance toward which the user equipment 130 is oriented. The processor 220 may determine the third home appliance toward which the user equipment 130 is oriented, by using the registered-home-appliance location information lookup table 231 in the memory 230. According to an embodiment of the disclosure, the processor 220 may recognize the location of the user equipment 130 in the house through the location measurement value of the user equipment 130, and compare the location of the user equipment 130 with a location measurement value of a registered home appliance stored in the registered-home-appliance location information lookup table 231 to determine the third home appliance toward which the user equipment 130 is oriented.

According to an embodiment of the disclosure, the processor 220 may select a GUI screen for controlling the third home appliance determined in a GUI list 232 for controlling registered home appliances in the memory 230, and provide the selected GUI screen for controlling the third home appliance to the user equipment 130.

The memory 230 may store a program for processing the processor 220 and store input/output data. For example, the memory 230 may store the registered-home-appliance location information lookup table 231 and the GUI list 232 for controlling the registered home appliances.

The registered-home-appliance location information lookup table 231 may be information in which information (a model name, a serial number, and a manufacturing date) of home appliances registered in the server device 110, location information (places where the home appliances are installed) of the registered home appliances, and location measurement values (coordinates at which the home appliances are located with respect to the second home appliance 140) of the registered home appliances are matched and stored.

The GUI list 232 for controlling the registered home appliances may be information where GUIs that may be provided to the user equipment 130 to control the home appliances registered in the server device 110 are stored. For example, when the air conditioner is registered in the server device 110, a GUI for controlling a temperature of the air conditioner or changing a mode of the air conditioner may be included in the GUI list 232 for controlling the registered home appliances.

Figure 3:
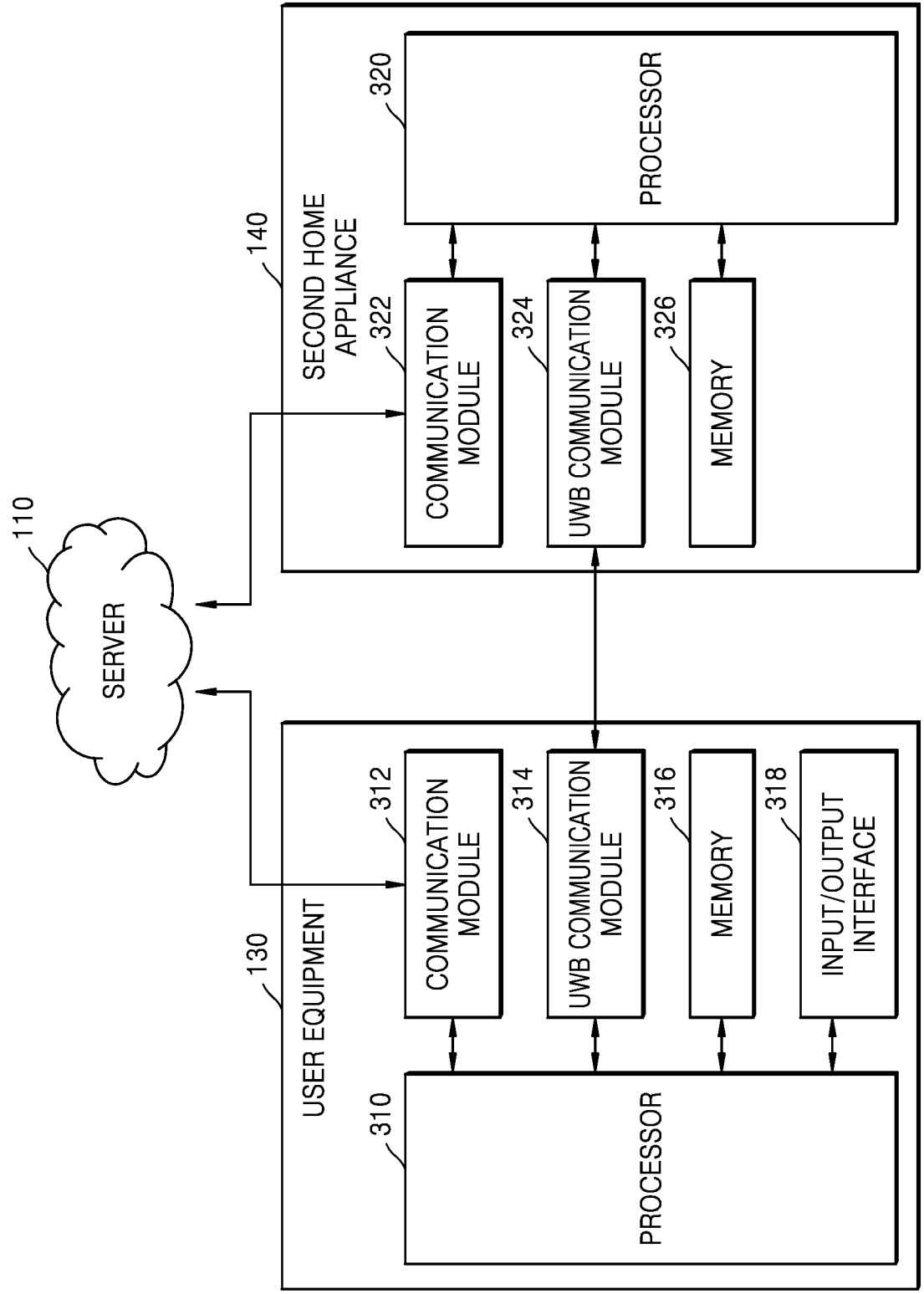
FIG. 3 is a diagram illustrating a user equipment, a second home appliance, and a server device according to an embodiment of the disclosure.

FIG. 3 is a diagram illustrating a user equipment, a second home appliance, and a server device according to an embodiment of the disclosure.

According to an embodiment of the disclosure, the second home appliance 140 may include a processor 320, a communication module 332, a UWB communication module 324, and a memory 326.

The second home appliance 140 may be an electronic device that performs a certain function. The second home appliance 140 may be arranged in a certain position in the house. The second home appliance 140 may serve as a reference point for measuring a relative location of the user equipment 130 located close to the first home appliance 120 and may be fixed at a certain position in the house without moving. The second home appliance 140 may include, for example, an AI speaker, an induction range, an illuminating device, a refrigerator, a kimchi refrigerator, a laundry machine, a television (TV), an air conditioner, an air cleaner, a steam closet, an oven, a microwave, an audio output device, a smart home hub device, etc.

The second home appliance 140 may perform its original function by including a certain home appliance function module. For example, in a refrigerator, the home appliance function module may include a cooler, a container, a door, a temperature sensor, a door opening/closing sensor, a lamp, etc. In another example, in a laundry machine, the home appliance function module may include a washing tub, a motor, a door, a door opening/closing sensor, a water supply unit, a drain unit, etc. In another example, in a vacuum cleaner, the home appliance function module may include a vacuum suction assembly, a dust container, a brush, etc.

The processor 320 may control an overall operation of the second home appliance 140. The processor 320 may be implemented as one or more processors. The processor 320 may perform a certain operation by executing an instruction or a command stored in the memory 326. The processor 320 may control an operation of components included in the second home appliance 140.

The communication module 322 may wirelessly or wiredly communicate with an external device. The communication module 322 may communicate with the user equipment 130 and the server device 110. The communication module 322 may communicate with the user equipment 130 by using a short-range communication scheme. For example, the communication module 322 may communicate with the user equipment 130 through Bluetooth or WiFi communication connection. The communication module 322 may communicate with the server device 110 by using a long-range communication scheme. For example, the communication module 322 may communicate with the AP device 150 through WiFi and with the server device 110 through a long-range communication network connected to the AP device 150.

The communication module 322 may include a wireless communication module (e.g., a cellular communication module, a short-range wireless communication module, a global navigation satellite system (GNSS) communication module) or a wired communication module (e.g., a local area network (LAN) communication module or a power line communication module). The communication module 322 may perform short-range communication, and may use, for example, Bluetooth, Bluetooth Low Energy (BLE), short-range wireless communication (near field communication (NFC)), a wireless local area network (WLAN) (Wireless Fidelity (WiFi)), Zigbee, infrared data association (IrDA) communication, WiFi Direct (WFD), Ant+ communication, etc. In another example, the communication module 322 may perform short-range communication, and may communicate with an external device, for example, through a legacy cellular network, a 5-Generation (5G) network, a next-generation communication network, Internet, a computer network (e.g., a local area network (LAN) or a wide area network (WAN)), etc.

The communication module 322 may establish communication with the user equipment 130 and the server device 110 under control of the processor 320. The communication module 322 may transmit a control signal and data to the user equipment 130 and the server device 110 or receive a control signal and data from the user equipment 130 and the server device 110.

The second home appliance 140 may be registered at an account registered in the server device 110 and may communicate with the server device 110. The second home appliance 140 may communicate with the user equipment 130 through a communication connection such as Bluetooth, WiFi, etc. According to an embodiment of the disclosure, the second home appliance 140 may communicate with another home appliance through a home network.

The UWB communication module 324 may include one or more components for allowing reception of a UWB signal transmitted from the UWB antenna included in the user equipment 130. The UWB communication module 324 may include one or more components for causing communication between the user equipment 130 and the second home appliance 140.

According to an embodiment of the disclosure, the UWB communication module 324 may include one or more components for allowing reception of a UWB signal. According to an embodiment of the disclosure, the UWB communication module 324 may include one or more components for causing UWB communication. UWB communication, which is ultra-wideband communication, may mean wireless communication to transmit large-volume information with low power over a wider band than an existing spectrum. Unlike a BLE communication technique for inferring existence of a user equipment in a specific space, a UWB communication technique may accurately determine a location where the user equipment exists. When the UWB communication technique is used, azimuth information and elevation information about the user equipment 130 with respect to the second home appliance 140 and distance information about the user equipment 130 with respect to the second home appliance 140 may be accurately measured. That is, when the UWB communication technique is used, the location of the user equipment 130 with respect to the second home appliance 140 may be accurately measured as coordinates of a spherical coordinate system.

The UWB communication module 324 according to an embodiment of the disclosure may include at least one UWB antenna. The at least one UWB antenna may receive a UWB signal transmitted from the UWB communication module 324 of the user equipment 130, and measure the exact location of the user equipment 130 based on the received UWB signal.

The UWB communication module 324 according to an embodiment of the disclosure may establish UWB communication with the user equipment 130 under control of the processor 320. The UWB communication module 324 may transmit a control signal and data to the user equipment 130 or receive a control signal and data from the user equipment 130.

The memory 326 may store various information, data, an instruction, a program, etc., required for an operation of the second home appliance 140. The memory 326 may include at least one of or a combination of volatile memory or non-volatile memory. The memory 326 may include a storage medium of at least one type of a flash memory type, a hard disk type, a multimedia card micro type, a card type memory (e.g., an SD or XD memory, etc.), a RAM, an SRAM, a ROM, an EEPROM, a PROM, a magnetic memory, a magnetic disk, an optical disk, or the like. The memory 326 may correspond to a web storage or a cloud server that performs a storage function on the Internet.

The user equipment 130 may include a processor 310, a communication module 312, a UWB communication module 314, a memory 316, and an input/output interface 318.

The processor 310 may control an overall operation of the user equipment 130. The processor 310 may be implemented as one or more processors. The processor 310 may perform a certain operation by executing an instruction or a command stored in the memory 326.

The communication module 312 may wirelessly or wiredly communicate with an external device. The communication module 312 may communicate with the second home appliance 140 and the server device 110. The communication module 312 may communicate with the second home appliance 140 through a short-range communication scheme. The communication module 312 may communicate with the server device 110 by using a long-range communication scheme.

The communication module 312 may include a wireless communication module (e.g., a cellular communication module, a short-range wireless communication module, a GNSS communication module) or a wired communication module (e.g., an LAN communication module or a power line communication module). The communication module 312 may perform short-range communication, and may use, for example, Bluetooth, BLE, short-range wireless communication (NFC), a WLAN (WiFi), Zigbee, IrDA communication, WFD, Ant+ communication, etc. In another example, the communication module 312 may perform short-range communication, and may communicate with an external device, for example, through a legacy cellular network, a 5G network, a next-generation communication network, Internet, a computer network (e.g., an LAN or a WAN), etc.

The communication module 312 may establish communication with the second home appliance 140 and the server device 110 under control of the processor 310. The communication module 312 may transmit a control signal and data to the second home appliance 140 and the server device 110 or receive a control signal and data from the second home appliance 140 and the server device 110.

The UWB communication module 314 may include one or more components for allowing transmission of a UWB signal that may be received by the UWB antenna included in the second home appliance 140. The UWB communication module 314 may include one or more components for causing communication between the user equipment 130 and the second home appliance 140.

The UWB communication module 314 according to an embodiment of the disclosure may include a UWB antenna. The UWB communication module 314 according to an embodiment of the disclosure may include at least three UWB antennas. After the user equipment 130 receives a user input to select the QR capturing button or performs NFC tagging after the UWB communication module activation signal from the server device 110, the location identification request signal may be transmitted from the user equipment 130 to the second home appliance 140. The location identification request signal according to an embodiment of the disclosure may be a UWB signal transmitted from the UWB antenna of the user equipment 130 to the UWB antenna of the second home appliance 140. The second home appliance 140 may accurately measure the location of the user equipment 130 with respect to the second home appliance 140 based on the location identification request signal that is transmitted to the second home appliance 140 by using the UWB antenna.

The UWB communication module 314 may establish communication with the second home appliance 140 under control of the processor 310, and may transmit or receive a control signal and data to or from the second home appliance 140.

The memory 316 may store various information, data, an instruction, a program, etc., required for an operation of the user equipment 130. The memory 316 may include at least one of or a combination of volatile memory or non-volatile memory. The memory 316 may include a storage medium of at least one type of a flash memory type, a hard disk type, a multimedia card micro type, a card type memory (e.g., an SD or XD memory, etc.), a RAM, an SRAM, a ROM, an EEPROM, a PROM, a magnetic memory, a magnetic disk, an optical disk, or the like. The memory 316 may correspond to a web storage or a cloud server that performs a storage function on the Internet.

The memory 316 stores an application for registering the first home appliance 120 or controlling the first home appliance 120 and the second home appliance 140. The processor 310 may execute an application to register the first home appliance 120 or control the first home appliance 120 and the second home appliance 140. The application may provide registration of the first home appliance 120 and monitoring, control, automation, a voice assistance, etc., of the first home appliance 120 and the second home appliance 140. The memory 316 may previously store an application or receive an application from a cloud server and store the application.

The input/output interface 318 may receive commands or data to be used in a component (e.g., the processor 310) of the user equipment from the outside (e.g., from a user) of the user equipment 130. The input/output interface 318 may include, for example, a touch screen, a touch pad, a key, a microphone, a mouse, a keyboard, or a digital pen (e.g., a stylus pen). The input/output interface 318 may include, for example, a display, a speaker, a vibration device, etc.

The input/output interface 318 may provide a GUI related to an application and receive a user input being input through the GUI. The input/output interface 318 may have more abundant features than input/output interfaces of the first home appliance 120 and the second home appliance 140. For example, the input/output interface 318 may include a touch screen, a key, a microphone, a speaker, a vibration device, etc., but the first home appliance 120 and the second home appliance 140 may include a limited number of keys and a small-size display. Embodiments of the disclosure may receive a control input to control the first home appliance 120 and the second home appliance 140 through the user equipment 130, exploiting the fact of the user equipment 130 having more abundant input/output features than the first home appliance 120 and the second home appliance 140.

Figure 4:
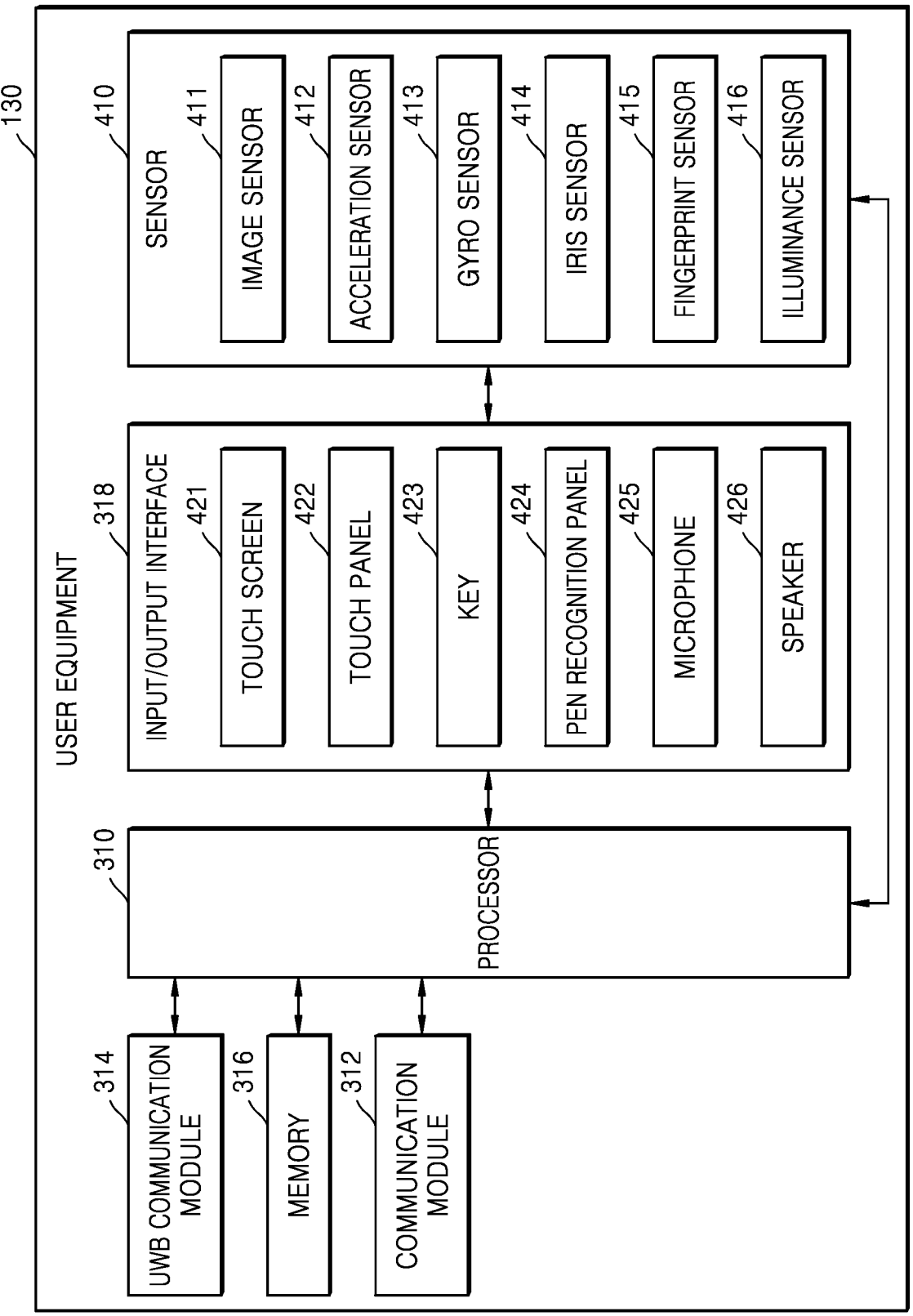
FIG. 4 is a block diagram illustrating a structure of a user equipment according to an embodiment of the disclosure.

FIG. 4 is a block diagram illustrating a structure of a user equipment according to an embodiment of the disclosure.

The user equipment 130 according to an embodiment of the disclosure may include the processor 310, the communication module 312, the UWB communication module 314, the memory 316, the input/output interface 318, and a sensor 410. The user equipment 130 may include abundant input/ output and sensor features when compared to the first home appliance 120 and the second home appliance 140. For example, the input/output interface 318 may include a touch screen 421, a touch panel 422, a key 423, a pen recognition panel 424, a microphone 425, a speaker 426, etc. The sensor 410 may include an image sensor 411, an acceleration sensor 412, a gyro sensor 413, an iris sensor 414, a fingerprint sensor 415, an illuminance sensor 416, etc.

The user equipment 130 may control the first home appliance 120 and the second home appliance 140 by using the input/output interface 318 and the sensor 410. The user equipment 130 may execute an application for controlling the first home appliance 120 and the second home appliance 140, and establish communication connection with the first home appliance 120 and the second home appliance 140. The user equipment 130 may receive a control signal in various forms through an application. The control signal may be input through the touch screen 421, the touch panel 422, the key 423, the pen recognition panel 424, the microphone 425, etc. The user equipment 130 may provide an output in various forms through an application. The output of the application may be output through the touch screen 421, the speaker 426, etc. In an embodiment of the disclosure, the touch screen 421 and the touch panel 422 may be formed as one piece.

Figure 5:
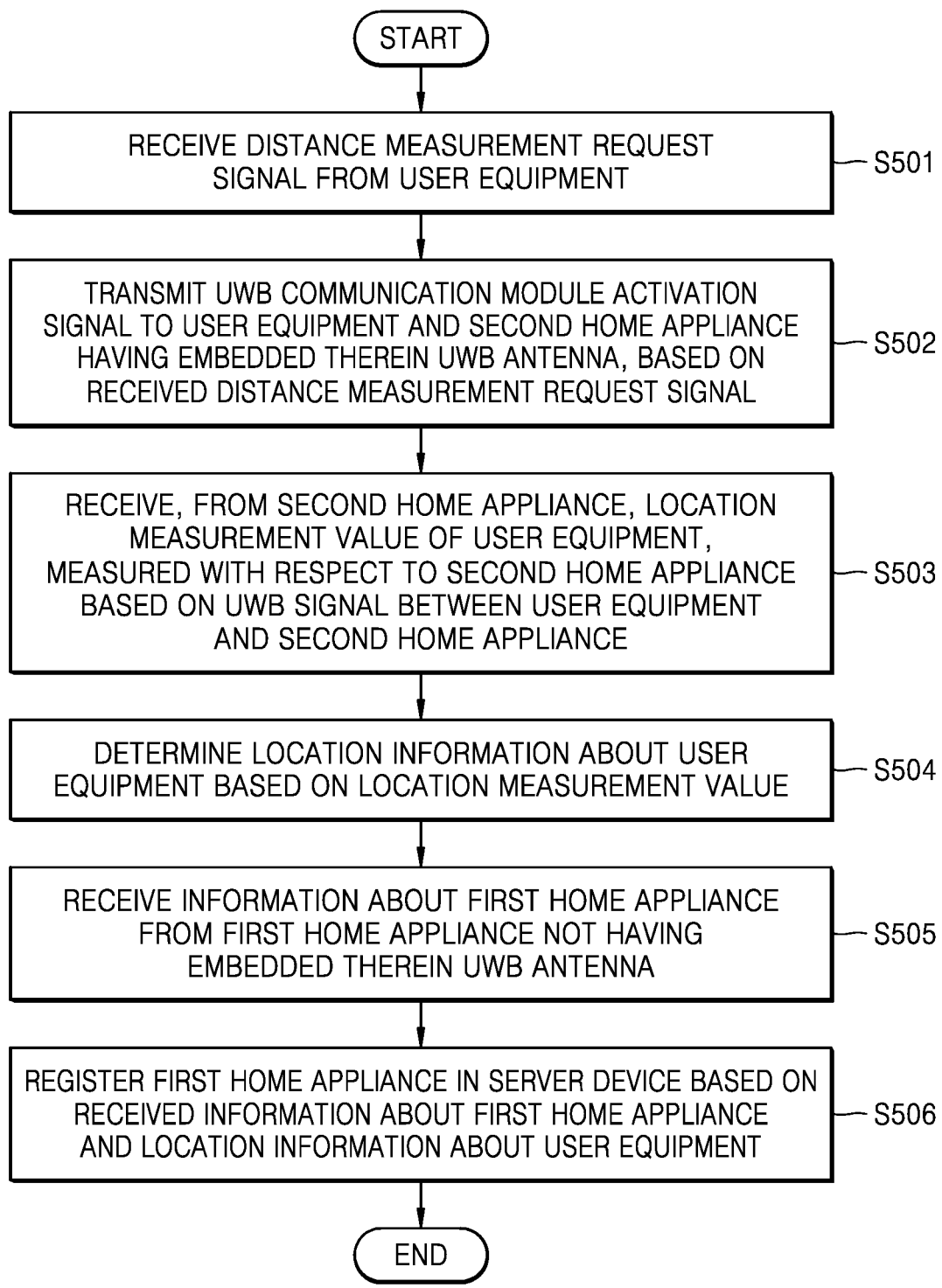
FIG. 5 is a flow diagram illustrating a method, performed by a server device, of controlling a home appliance according to an embodiment of the disclosure.

FIG. 5 is a flow diagram illustrating a method, performed by a server device, of controlling a home appliance according to an embodiment of the disclosure.

In operation S501, the server device 110, according to an embodiment of the disclosure, may receive a distance measurement request signal from the user equipment 130.

According to an embodiment of the disclosure, the user may register the first home appliance 120 in the server device 110 and desire to conveniently control the first home appliance 120 through an application installed in the user equipment 130. In a process of registering the first home appliance 120 by using the user equipment 130, information (a product name, a product serial number, a manufacturing date, etc.) of the first home appliance 120 may be automatically transmitted to the server device 110. However, the first home appliance 120 lacks a UWB antenna, such that there may be a difficulty in automatically designating the location of the first home appliance 120 in the server device 110 by using the UWB communication technique. Thus, according to an embodiment of the disclosure, to register the first home appliance 120 in the server device 110, a scheme may be proposed to measure the location of the user equipment 130 including the UWB antenna located close to the first home appliance 120 by using the UWB communication technique, and to use the measured location of the user equipment 130 as the location of the first home appliance 120.

According to an embodiment of the disclosure, the user equipment 130 may display, on a display, a registered-device control GUI for controlling home appliances registered in the server device 110. The user equipment 130 may display a device registration GUI on the display by receiving a user input to select a certain button (e.g., a plus (+) indication) displayed on the registered-device control GUI. According to an embodiment of the disclosure, the user may register the first home appliance 120 in the server device 110 through the device registration GUI displayed on the user equipment 130.

According to an embodiment of the disclosure, to register the first home appliance 120 in the server device 110, the first home appliance 120 has to receive information for connection to the AP device 150 from the user equipment 130. To receive the information for connection to the AP device 150, WiFi communication has to be established between the first home appliance 120 and the user equipment 130 such that the first home appliance 120 has to switch to the network connection mode. In this case, a method to switch to the network connection mode varies from home appliance to home appliance, such that the user may capture a QR code attached onto the first home appliance 120 using the user equipment 130 or perform NFC tagging by touching an NFC tag region of the first home appliance 120 using the user equipment 130, whereby the first home appliance 120 may obtain a guide to switch to the network connection mode.

To this end, the user equipment 130 may receive a user input to select a QR code capturing menu or an NFC tagging menu in the device registration GUI. In this case, when the user equipment 130 receives the user input to select the QR code capturing menu or the NFC tagging menu from the user, the user equipment 130 may display a QR code capturing screen or a screen on which a method for performing NFC tagging is described. A process of receiving the user input to select the QR code capturing menu or the NFC tagging menu from the user equipment 130 may be the first process to register the first home appliance 120 in the server device 110. Thus, at this time, the user equipment 130 may transmit a distance measurement request signal to the server device 110.

According to an embodiment of the disclosure, when the user equipment 130 receives the user input to select the QR code capturing menu or the NFC tagging menu in the device registration GUI, the user equipment 130 may transmit the distance measurement request signal to the server device 110. According to an embodiment of the disclosure, when the server device 110 receives the distance measurement request signal from the user equipment 130, the server device 110 may identify existence of a home appliance having embedded therein a UWB antenna capable of measuring the location of the user equipment 130 (hereinafter, a UWB home appliance) among home appliances registered in the server device 110.

In operation S502, the server device 110, according to an embodiment of the disclosure, may transmit a UWB communication module activation signal to the user equipment 130 and to the second home appliance 140 having embedded therein a UWB antenna, based on the received distance measurement request signal.

According to an embodiment of the disclosure, when the server device 110 receives the distance measurement request signal from the user equipment 130, the server device 110 may identify existence of the UWB home appliance registered in the same user account as a user account of the user equipment 130 in the server device 110. In this case, the registered UWB home appliance may be a home appliance that serves as a reference point with respect to which the location of the user equipment 130 is measured. The server device 110 may store location information about another registered home appliance in the house with respect to the registered UWB home appliance, as a lookup table (hereinafter, a registered-home appliance location information lookup table). According to an embodiment of the disclosure, the UWB home appliance registered in the server device 110 may be the second home appliance 140.

According to an embodiment of the disclosure, where there is a registered UWB home appliance, the server device 110 may transmit the UWB communication module activation signal to the user equipment 130 and the second home appliance 140. According to an embodiment of the disclosure, the UWB antenna included in the second home appliance 140 may receive a UWB signal transmitted from the UWB antenna included in the user equipment 130. In this case, the UWB communication module activation signal may be a signal for activating sensors of the UWB antennas respectively included in the user equipment 130 and the second home appliance 140.

In operation S503, the server device 110, according to an embodiment of the disclosure, may receive, from the second home appliance 140, a location measurement value of the user equipment 130 measured with respect to the second home appliance 140 based on the UWB signals of the user equipment 130 and the second home appliance 140. On the other hand, the server device 110 may receive the location measurement value of the user equipment 130 measured with respect to the second home appliance 140, from the user equipment 130.

According to an embodiment of the disclosure, to receive a guide for switching the first home appliance 120 to the network connection mode, the user may capture the QR code attached to the first home appliance 120 by using the user equipment 130 or touch an NFC tag region of the first home appliance 120 using the user equipment 130 to perform NFC tagging. In this case, to capture the QR code attached to the first home appliance 120, the user equipment 130 needs to be located very close to the first home appliance 120. To cause NFC tagging between the first home appliance 120 and the user equipment 130, the user equipment 130 has to be attached to a certain region of the first home appliance 120 or be placed very close to the certain region, such that the user equipment 130 may be located very close to the first home appliance 120 in this case. Thus, in the case that the location of the user equipment 130 may be measured at a moment when the user presses a QR code capturing button or NFC tagging is performed, the measured location of the user equipment 130 may be used as the location of the first home appliance 120.

According to an embodiment of the disclosure, when the user equipment 130 receives a user input to select the QR capturing button or NFC tagging is performed between the user equipment 130 and the first home appliance 120, the location identification request signal may be transmitted from the user equipment 130 to the second home appliance 140. According to an embodiment of the disclosure, the location identification request signal may be a UWB signal transmitted from the UWB antenna included in the user equipment 130 to the UWB antenna included in the second home appliance 140.

According to an embodiment of the disclosure, the second home appliance 140 may measure a relative location measurement value of the user equipment 130 with respect to the second home appliance 140, based on a UWB signal that is the received location identification request signal. In this case, the location measurement value of the user equipment 130 may include azimuth information and elevation information about the user equipment 130 measured with respect to the second home appliance 140 and distance information between the second home appliance 140 and the user equipment 130. The server device 110 according to an embodiment of the disclosure may receive the location measurement value of the user equipment 130 from the second home appliance 140.

In operation S504, the server device 110, according to an embodiment of the disclosure, may determine the location information about the user equipment 130 based on the location measurement value.

According to an embodiment of the disclosure, the server device 110 may determine the location information about the user equipment 130 based on a a location information lookup table of registered home appliances (hereinafter, a "lookup table") stored in the server device 110. According to an embodiment of the disclosure, the server device 110 may have stored a lookup table including location information and location measurement values of home appliances registered in the server device 110. Herein, the location measurement values of the registered home appliances may mean values measured with respect to the second home appliance 140, like the location measurement value of the user equipment 130.

The server device 110 according to an embodiment of the disclosure may compare the location measurement value of the user equipment 130 with the location measurement values of the registered home appliances, included in the lookup table, to identify a registered home appliance determined to be most similar to the location measurement value of the user equipment 130. The server device 110 according to an embodiment of the disclosure may determine the location information about the user equipment 130 by using the location information about the registered home appliance, which is determined to be most similar to the location measurement value of the user equipment 130, as the location information about the user equipment 130. Herein, the location information may mean information about a place, such as a room or section of a building, where an appliance is installed. For example, when a TV is installed in a living room of a house, the location information about the TV may indicate the living room.

In operation S505, the server device 110, according to an embodiment of the disclosure, may receive information about the first home appliance 120 from the first home appliance 120 having no UWB antenna embedded therein.

According to an embodiment of the disclosure, a process of measuring the location of the user equipment 130 with respect to the second home appliance 140 may be performed simultaneously with a process of registering the first home appliance 120. The process of registering the first home appliance 120 may be performed through WiFi communication established between the first home appliance 120 and the user equipment 130.

According to an embodiment of the disclosure, the user equipment 130 may receive a user input to capture a QR code attached to the first home appliance 120, thus identifying a uniform resource locator (URL) address included in the QR code and provide a guide for switching the first home appliance 120 to the network connection mode to the user. The user equipment 130 may establish NFC communication with the first home appliance 120 by performing NFC tagging with the first home appliance 120. The user equipment 130 may be provided with the guide for switching the first home appliance 120 to the network connection mode from the first home appliance 120 through the established NFC communication, and provide the provided guide to the user.

In this case, the user may manipulate the first home appliance 120 according to the provided guide to switch the first home appliance 120 to the network connection mode, and establish WiFi communication between the first home appliance 120 and the user equipment 130. The first home appliance 120, according to an embodiment of the disclosure, may use a software enabled AP (SoftAP) that enables the first home appliance 120 to be recognized as a virtual AP. The SoftAP may be a WLAN client, but may be implemented as software serving as a wireless AP. The SoftAP may operate like the wireless AP. The first home appliance 120 may drive the SoftAP by using a WiFi module. The user equipment 130 may establish WiFi communication connection with the first home appliance 120 by connecting to the SoftAP of the first home appliance 120, and perform WiFi communication with the first home appliance 120. WiFi communication connection between the user equipment 130 and the first home appliance 120 by using the SoftAP may correspond to WiFi Direct.

According to an embodiment of the disclosure, through WiFi communication established between the first home appliance 120 and the user equipment 130, information about the AP device 150 (an SSID of the AP device 150, an ID of the AP device 150, a password, an authentication scheme, an encryption method, an authentication key, etc.) may be transmitted from the user equipment 130 to the first home appliance 120. The first home appliance 120 may connect to the server device 110 based on the information about the AP device 150, and transmit information (a product name, a product serial number, a manufacturing date, etc.) of the first home appliance 120 to the server device 110. The first home appliance 120 may transmit user account information received from the user equipment 130 to the server device 110.

In operation S506, the server device 110, according to an embodiment of the disclosure, may register the first home appliance 120 in the server device 110 based on the received information about the first home appliance 120 and the location information about the user equipment 130.

The server device 110, according to an embodiment of the disclosure, may use the determined location information about the user equipment 130 as the location information about the first home appliance 120. According to an embodiment of the disclosure, when the user registers the first home appliance 120 in the server device 110, the user needs to locate the user equipment 130 at a distance very close to the first home appliance 120 and thus may use the location information about the user equipment 130 as the location information about the first home appliance 120. For example, to register a refrigerator installed in the kitchen in the server device 110, the user may obtain a guide for registering the refrigerator in the server device 110 by capturing the QR code attached onto a front surface of the refrigerator, and at this time, the location information about the user equipment 130 may be determined. The location of the user equipment 130 determined when the user captures the QR code on the front surface of the refrigerator is the same as the location of the refrigerator, such that the location information about the user equipment 130 determined at this time may be used as the location information about the refrigerator.

The server device 110 according to an embodiment of the disclosure may register the first home appliance 120 in the server device 110, based on the location information about the first home appliance 120 that is the same as the location information about the user equipment 130 and the information about the first home appliance 120. The server device 110, according to an embodiment of the disclosure, may register the first home appliance 120 at a certain account of the server device 110, based on the location information about the first home appliance 120 and the information about the first home appliance 120. The server device 110, according to an embodiment of the disclosure, may match the information about the first home appliance 120, the location information about the first home appliance 120 (which is the same as the location information about the user equipment 130), and the location measurement value of the first home appliance 120 (which is the same as the location measurement value of the user equipment 130) to update them in the location information lookup table of registered home appliances.

According to an embodiment of the disclosure, after the first home appliance 120 is registered in the server device 110, the first home appliance 120 may transmit state information, sensor information, monitoring information, a support request, a data processing request, etc., of the first home appliance 120 to the server device 110. After the first home appliance 120 is registered in the server device 110, the first home appliance 120 may receive a control signal from the server device 110 and operate.

Figure 6:
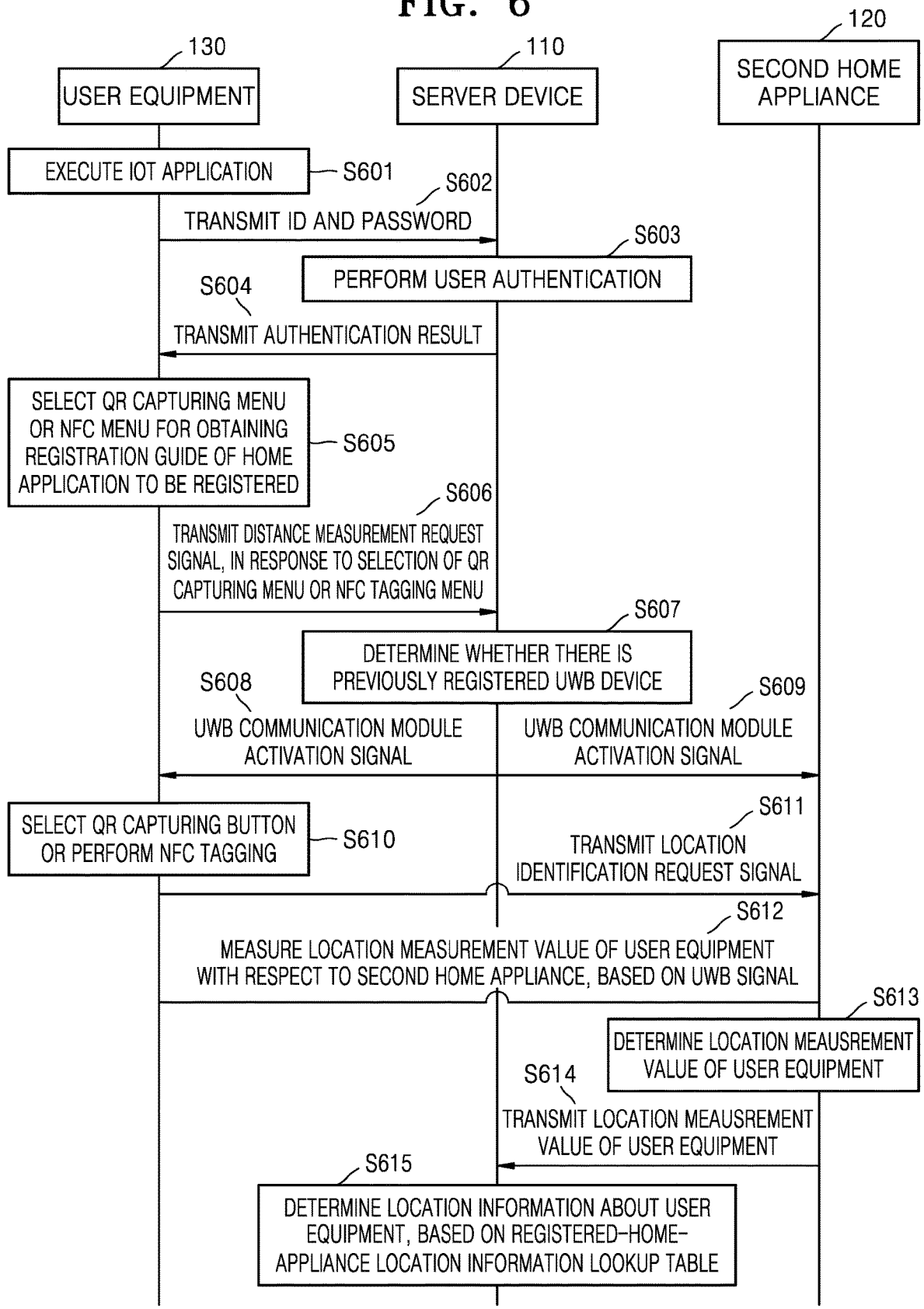
FIG. 6 is a sequence diagram illustrating a method, performed by a server device in cooperation with other devices, of determining location information about a user equipment according to an embodiment of the disclosure.

Referring to FIG. 6, a detailed description will be made of an operation, performed by the server device 110, of receiving a location measurement value of the user equipment 130 from the second home appliance 140 and determining location information about the user equipment 130.

FIG. 6 is a sequence diagram illustrating a method, performed by a server device in cooperation with other devices, of determining location information about a user equipment according to an embodiment of the disclosure.

The user equipment 130 according to an embodiment of the disclosure may execute an IoT application in operation S601, and transmit an ID and a password for execution of the IoT application to the server device 110 in operation S602. The IoT application installed in the user equipment 130, according to an embodiment of the disclosure, may be an application capable of providing a function such as monitoring, control, automation, voice assistance, etc., of a home appliance registered at a certain account of the server device 110.

The server device 110 according to an embodiment of the disclosure may perform user authentication in operation S603 and transmit an authentication result to the user equipment 130 in operation S604. The server device 110 according to an embodiment of the disclosure may determine whether the ID and the password received from the user equipment 130 match an ID and a password stored in the server device 110 to perform user authentication. The server device 110 according to an embodiment of the disclosure may perform user authentication, and when the user equipment 130 is authenticated as a legitimate user, an authentication result may be transmitted to the user equipment 130. The server device 110, according to an embodiment of the disclosure, may provide the registered-device control GUI to the user equipment 130. Referring to an illustrative scenario 700a depicted in FIG. 7, registered home appliances (an illuminating device, an air conditioner, a TV, a speaker) may be controlled through the registered-device control GUI displayed on the display of the user equipment 130.

In operation S605, the user equipment 130, according to an embodiment of the disclosure, may receive a user input to select a QR capturing menu or an NFC tagging menu for obtaining a registration guide of a home appliance to be registered, from a device registration GUI.

Figure 7:
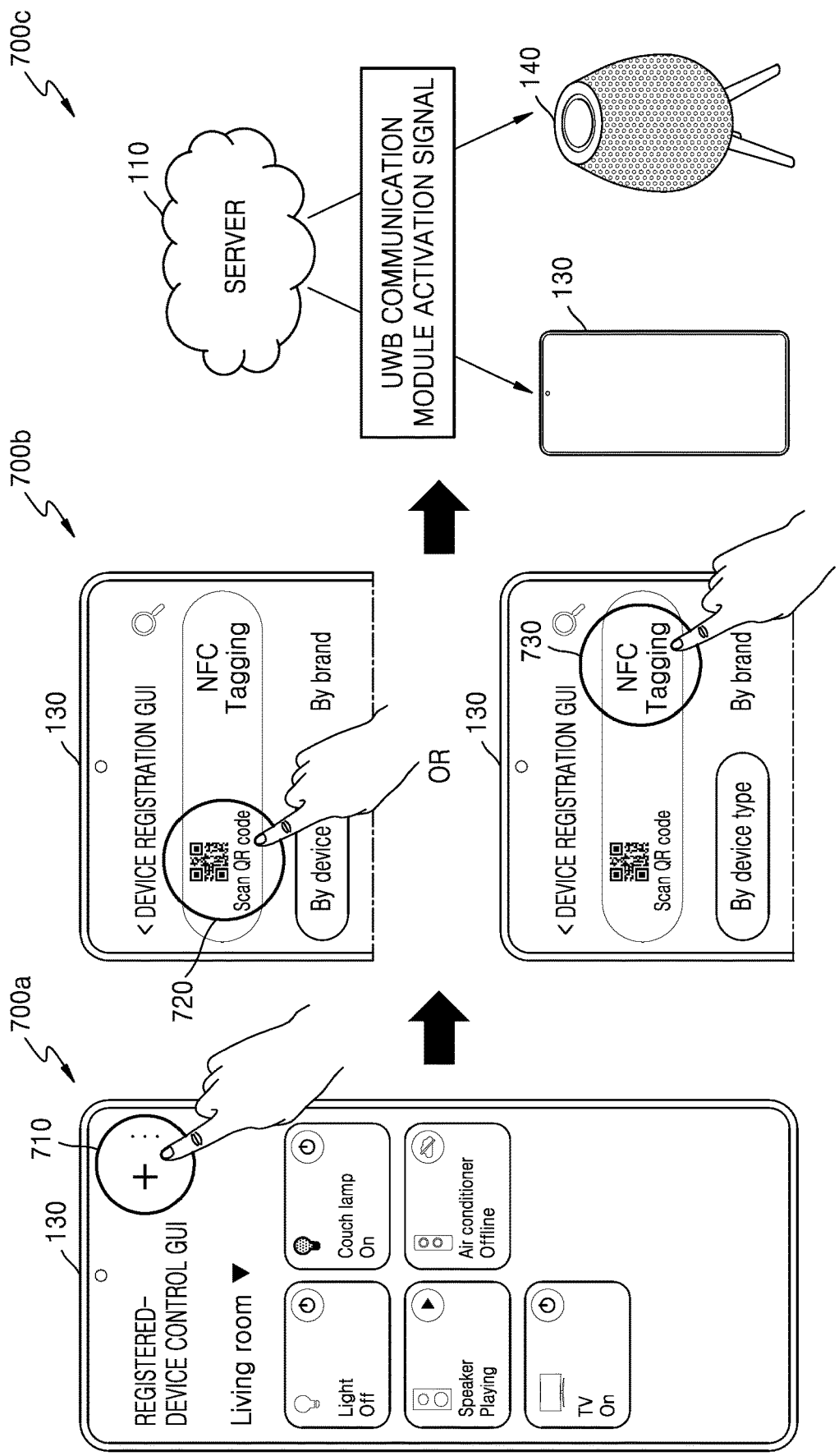
FIG. 7 depicts an illustrative example of operation of a method, performed by a server device, of transmitting an ultra-wideband (UWB) communication module activation signal according to an embodiment of the disclosure.

Referring to the illustrative scenario 700a of FIG. 7, the registered-device control GUI may be displayed on the display of the user equipment 130, and the user may control not only the registered home appliances, but also attempt registration of a new home appliance, through the registered-device control GUI. According to an embodiment of the disclosure, the user equipment 130 may display the device registration GUI on the display by receiving a user input to select a plus button 710 that is a certain button displayed on the registered-device control GUI.

Referring to an illustrative scenario 700b depicted in FIG. 7, the device registration GUI may be displayed on the display of the user equipment 130, and a QR capturing menu 720 or an NFC tagging menu 730 may be included in the device registration GUI. The user may start a series of processes for registering a home appliance by selecting the QR capturing menu 720 or the NFC tagging menu 730 displayed on the device registration GUI.

In operation S606, the user equipment 130, according to an embodiment of the disclosure, may transmit a distance measurement request signal from the user equipment 130 to the server device 110 in response to selection of the QR capturing menu or the NFC tagging menu. The distance measurement request signal according to an embodiment of the disclosure may be a signal serving as a trigger for determining whether a home appliance having embedded therein a UWB antenna capable of measuring a location of the user equipment 130 is registered in the server device 110.

In operation S607, the server device 110, according to an embodiment of the disclosure, may determine whether there is a UWB device having embedded therein a UWB antenna among home appliances registered at a certain account of the server device 110. The UWB device, according to an embodiment of the disclosure, may be a device that serves as a reference point with respect to which the location of the user equipment 130 may be measured. For the described method of FIG. 6, the second home appliance 140 is such a UWB device, and is so identified at operation S607.

In operations S608 and S609, the server device 110, according to an embodiment of the disclosure, may transmit the UWB communication module activation signal to the user equipment 130 and the second home appliance 140. Referring to an illustrative scenario 700c depicted in FIG. 7, the server device 110 may transmit the UWB communication module activation signal to the user equipment 130, and to the second home appliance 140 that is a UWB device registered in the server device 110. According to an embodiment of the disclosure, the UWB communication module activation signal may be a signal inducing activation of the UWB antennas respectively included in the user equipment 130 and the second home appliance 140 to exchange UWB signals with the user equipment 130 and the second home appliance 140.

Figure 8:
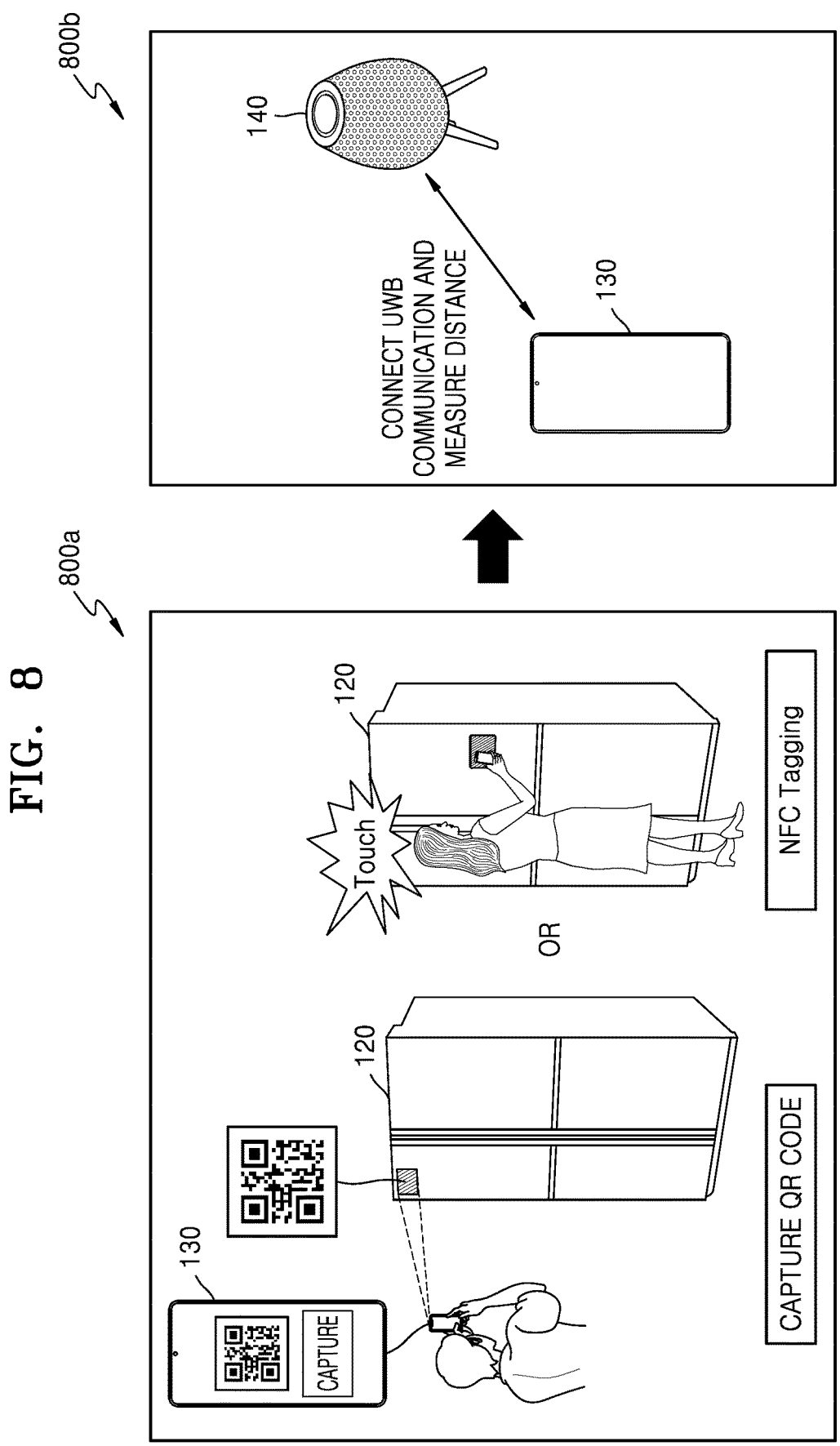
FIG. 8 depicts an illustrative example of operation of a method for measuring, by a second home appliance, a location of a user equipment according to an embodiment of the disclosure.

In operation S610, the user equipment 130, according to an embodiment of the disclosure, may receive an input to select a QR capturing button or detect that NFC tagging is performed. According to an embodiment of the disclosure, to receive a guide for switching a home appliance to be registered to the network connection mode, the user may capture the QR code attached to the home appliance by using the user equipment 130 or touch a home appliance using the user equipment 130 to perform NFC tagging. Referring to an illustrative scenario 800a depicted in FIG. 8, when a home appliance to be registered is a refrigerator, the user may capture the QR code attached onto the front surface of the refrigerator, or may touch a certain region (an NFC tag region) on the front surface of the refrigerator using the user equipment 130 to perform NFC tagging between the refrigerator and the user equipment 130.

When the user equipment 130 captures the QR code attached onto the front surface of the refrigerator or is caused to touch the NFC tag region of the refrigerator to perform NFC tagging, the user equipment 130 is expected to be located at a distance very close to the refrigerator. Thus, when the user equipment 130 receives the user input to capture the QR code or detects that NFC tagging is performed, the location of the user equipment 130 may be used as a location of the refrigerator when the location of the user equipment 130 may be measured.

In operation S611, the user equipment 130, according to an embodiment of the disclosure, may transmit the location identification request signal to the second home appliance 140. According to an embodiment of the disclosure, when the user equipment 130 captures the QR code attached to a home appliance (the refrigerator) to be registered or performs NFC tagging with the home appliance (the refrigerator) to be registered, the user equipment 130 may transmit the location identification request signal to the second home appliance 140.

According to an embodiment of the disclosure, the location identification request signal may be a UWB signal transmitted from the UWB antenna included in the user equipment 130 to the UWB antenna included in the second home appliance 140. Referring to an illustrative scenario 800b depicted in FIG. 8, the location identification request signal may be transmitted from the user equipment 130, which is located very close to the refrigerator, to the second home appliance 140. The second home appliance 140 may measure the location of the user equipment 130 based on the location identification request signal.

In operation S612, the second home appliance 140, according to an embodiment of the disclosure, may measure the location measurement value of the user equipment 130 based on the UWB signal that is the location identification request signal. The location measurement value of the user equipment 130, according to an embodiment of the disclosure, may include azimuth information and elevation information about the user equipment 130 measured with respect to the second home appliance 140 and distance information between the second home appliance 140 and the user equipment 130. In addition, the location measurement value of the user equipment 130, according to an embodiment of the disclosure, may include information related to existence of a wall on a linear distance between the second home appliance 140 and the user equipment 130.

Figure 9:
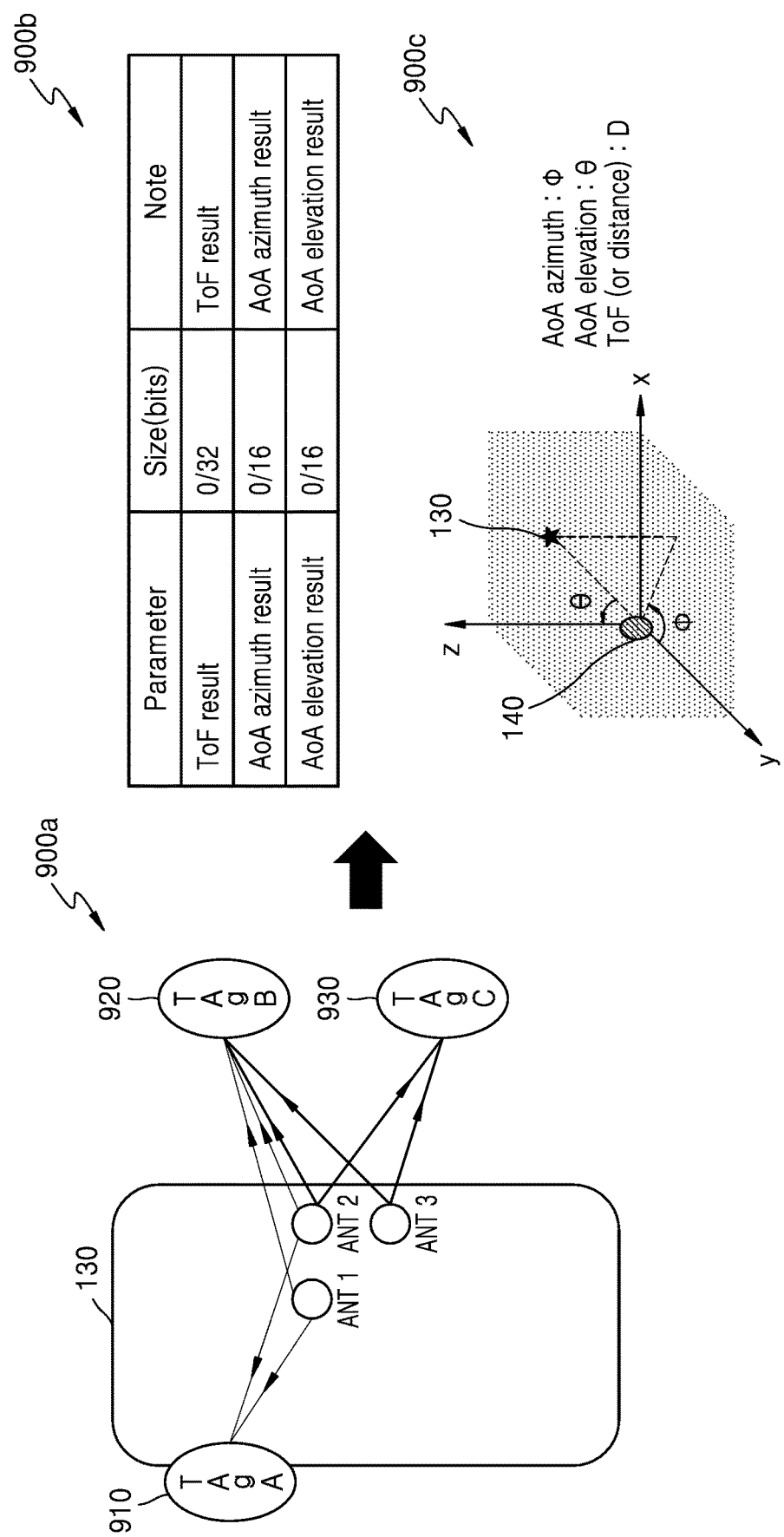
FIG. 9 depicts an illustrative example of operation of a method, performed by a second home appliance, of measuring a location of a user equipment by using a UWB signal according to an embodiment of the disclosure.

Referring to an illustrative scenario 900a depicted in FIG. 9, the user equipment 130 may include three UWB antennas ANT 1, ANT 2, and ANT 3. A tag A 910, a tag B 920, and a tag C 930 may indicate UWB antennas included in the second home appliance 140. The tag A 910 may detect UWB signals received from the antenna ANT 1 and the antenna ANT 2, but may fail to detect a UWB signal received from the antenna ANT 3. The tag B 920 may detect the UWB signals received from the antennas ANT 1, ANT 2, and ANT 3. The tag C 930 may detect the UWB signals received from the antenna ANT 2 and the antenna ANT 3, but may fail to detect the UWB signal received from the antenna ANT 1. Thus, the relative location of the user equipment 130 may be measured as a different value according to the location of the second home appliance 140.

Referring to data of a data chart 900b presented in FIG. 9, the UWB antenna included in the second home appliance 140 may measure a time-of-flight (ToF) result (or distance) between the user equipment 130 and the second home appliance 140, an angle of arrival (AoA) azimuth result of the user equipment with respect to the second home appliance 140, and an AoA elevation result.

According to an embodiment of the disclosure, the UWB antenna included in the second home appliance 140 may measure a distance between the second home appliance 140 and the user equipment 130 by using a double-side two-way ranging (DS-TWR) technique. The DS-TWR technique may determine a time of flight of a UWB signal transmitted from the user equipment 130 and multiply the determined time of flight by a speed of light to measure a distance between the second home appliance 140 and the user equipment 130.

According to an embodiment of the disclosure, the UWB antenna included in the second home appliance 140 may measure an azimuth and an elevation of the user equipment 130 with respect to the second home appliance 140 by using an AoA-based positioning method. In this case, referring to an example positional chart 900c presented in FIG. 9, the azimuth ($\Phi$) may be an angle formed between a z axis and the user equipment 130 when the second home appliance 140 is assumed to exist at the origin. The elevation ($\theta$) may be an angle formed between an x axis and the user equipment 130 when the second home appliance 140 is assumed to exist at the origin.

In operation S613, the second home appliance 140, according to an embodiment of the disclosure, may determine the location measurement value of the user equipment 130.

In operation S614, the second home appliance 140, according to an embodiment of the disclosure, may transmit the location measurement value of the user equipment 130 to the server device 110. Alternatively, the second home appliance 140 may transmit the location measurement value of the user equipment 130 to the user equipment 130 which may then transmit the location measurement value thereof to the server device 110.

In operation S615, the server device 110, according to an embodiment of the disclosure, may determine the location information about the user equipment 130 based on the registered-home-appliance location information lookup table. A detailed description of a method, performed by the server device 110, of determining location information about the user equipment 130 will be described with reference to FIG. 10.

In the illustrative embodiment described with reference to FIGS. 6 to 9, an example is described where the first home appliance 120 is a home appliance not registered in the server device 110, but the disclosure is not limited thereto. That is, the first home appliance 120 may be a home appliance already registered in the server device 110, wherein the server device 110 does not yet store the location information measurement value of the first home appliance 120. The user equipment 130 may perform an NFC tagging or QR code capturing process of the first home appliance 120, and in this case, the location information measurement value measured between the user equipment 130 and the second home appliance 140 may match and be stored in the first home appliance 120.

Figure 10:
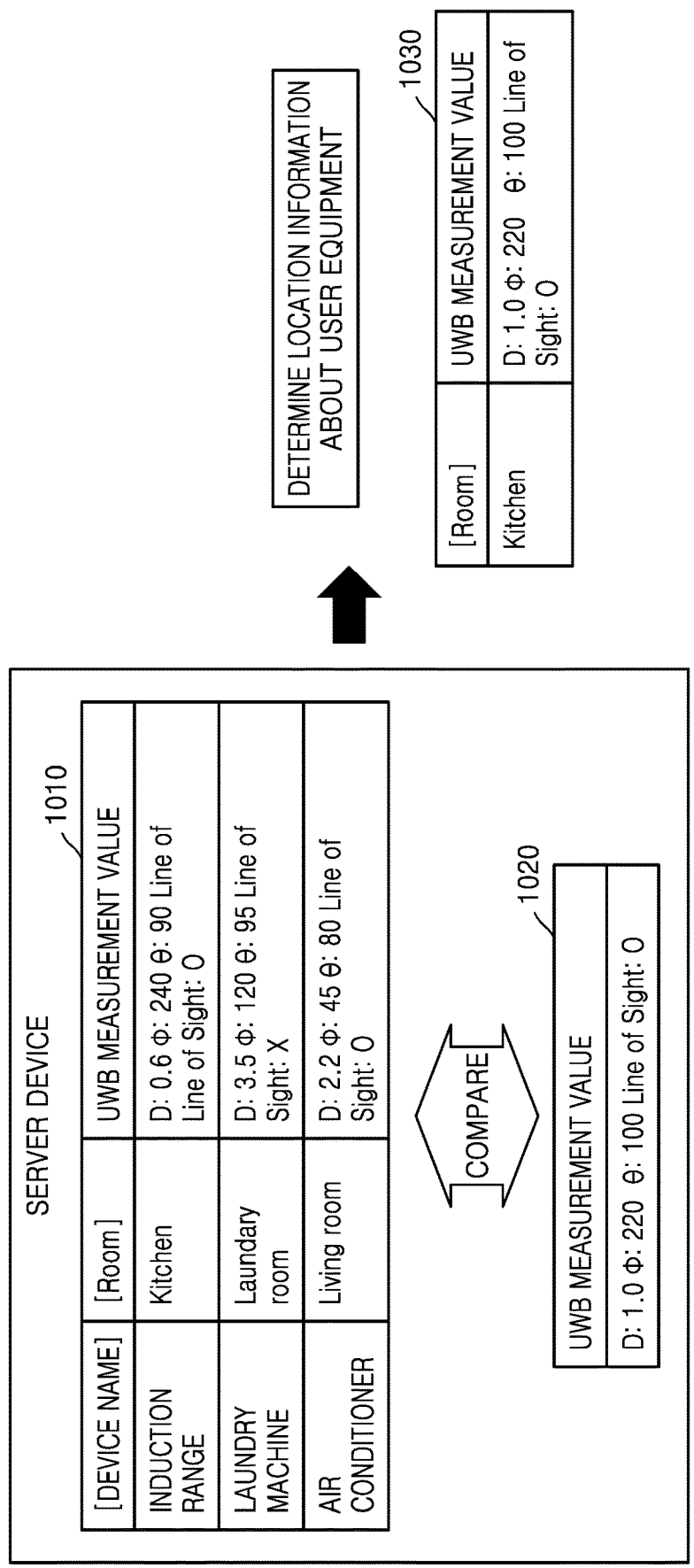
FIG. 10 depicts an illustrative example of operation of a method, performed by a server device, of determining location information about a user equipment according to an embodiment of the disclosure.

FIG. 10 depicts an illustrative example of operation of a method, performed by a server device, of determining location information about a user equipment according to an embodiment of the disclosure.

According to an embodiment of the disclosure, the server device 110 may have stored a lookup table including location information and location measurement values of home appliances registered in the server device 110. Herein, a lookup table including location information and location measurement values of registered home appliances may be referred to as a "registered-home-appliance location information lookup table". Referring to FIG. 10, when an induction range, a laundry machine, and an air conditioner are registered in the server device 110, the location information and the location measurement values of the registered home appliances may be stored in a lookup table 1010.

The location information about the registered home appliance, according to an embodiment of the disclosure, may mean a location where the registered home appliance is installed. Referring to the lookup table 1010 of FIG. 10, location information about the induction range may be stored as a kitchen, location information about the refrigerator may be stored as a laundry room, and location information about the air conditioner may be stored as a living room.

The location measurement value of the registered home appliance according to an embodiment of the disclosure may include an azimuth ($\Phi$) parameter value and an elevation ($\theta$) parameter value of the registered home appliance with respect to the second home appliance 140, a distance (D) between the second home appliance 140 and the registered home appliance, and a line of sight indicator value indicating whether an obstacle exists on a linear path between the registered home appliance and the second home appliance 140.

Referring to the lookup table 1010 of FIG. 10, a location measurement value of the induction range may include a distance value (D: 0.6), an azimuth parameter value ($\Phi$: 240 degrees), an elevation parameter value ($\theta$: 90 degrees), and information indicating that no obstacle exists on the linear path. The location measurement value of the refrigerator may include a distance value (D: 3.5), an azimuth parameter value($\Phi$: 120 degrees), an elevation parameter value($\theta$: 95 degrees), and information indicating that an obstacle exists on the linear path. The location measurement value of the air conditioner may include a distance value (D: 2.2), an azimuth parameter value($\Phi$: 45 degrees), an elevation parameter value($\theta$: 80 degrees), and information indicating that no obstacle exists on the linear path.

The server device 110 according to an embodiment of the disclosure may compare location measurement values of home appliances stored in the lookup table 1010 with the location measurement value of the user equipment 130 and determine, as the location information about the user equipment 130, location information about a registered home appliance determined to be most similar to the location measurement value of the user equipment 130.

A location measurement value 1020 of the user equipment 130 of FIG. 10 may include a distance value (D: 1.0), an azimuth parameter value($\Phi$: 220 degrees), an elevation parameter value($\theta$: 100 degrees), and information indicating that no obstacle exists on the linear path. In this case, the server device 110 may compare that a location measurement value 1020 of the user equipment 130 with location measurement values of the induction range, the laundry machine, and the air conditioner and determine that the location measurement value 1020 of the user equipment 130 is most similar to the location measurement value of the induction range. When the server device 110 determines that the location measurement value 1020 of the user equipment 130 is most similar to the location measurement value of the induction range, the location information about the induction range may be determined as the location information about the user equipment 130.

The server device 110 according to an embodiment of the disclosure may determine a kitchen, which is location information about the induction range, as the location information about the user equipment 130. The server device 110, according to an embodiment of the disclosure, may store information 1030 including the determined location information and the location measurement value of the user equipment 130 in data.

Figure 11:
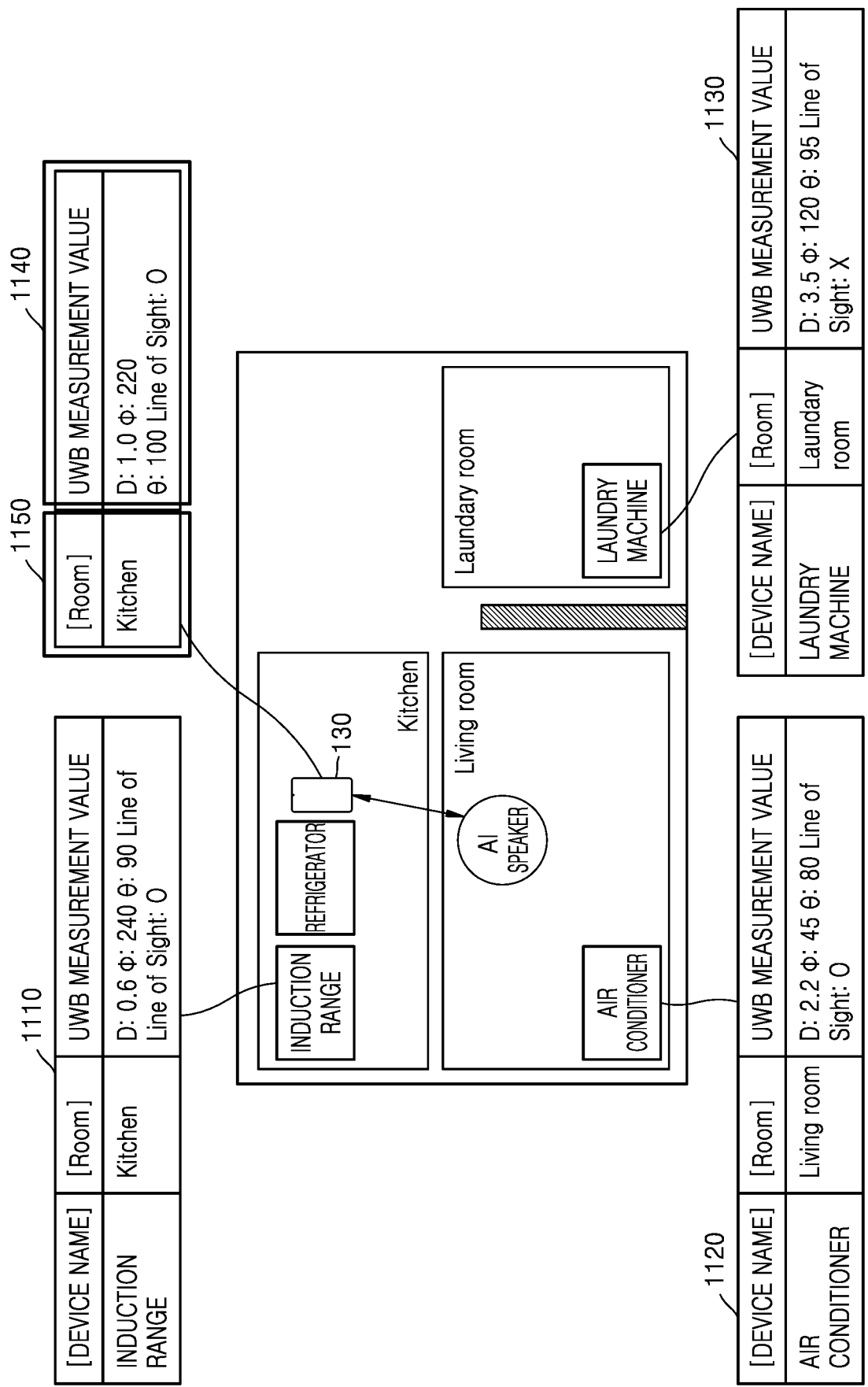
FIG. 11 further depicts an illustrative example of operation of a method, performed by a server device, of determining location information about a user equipment according to an embodiment of the disclosure.

FIG. 11 further depicts an illustrative example of operation of a method, performed by a server device, of determining location information about a user equipment according to an embodiment of the disclosure.

Referring to FIG. 11, a refrigerator may be a home appliance not registered in the server device 110, and the user equipment 130 may be located at a distance very close to the refrigerator to register the refrigerator in the server device 110. Thus, the location information about the user equipment 130 may be used as the location information about the refrigerator to be registered.

Referring to FIG. 11, the induction range may be located in the kitchen in the house, the air conditioner may be located in the living room in the house, and the laundry machine may be located in the laundry room in the house. All of the induction range, the air conditioner, and the laundry machine may be home appliances previously registered in the server device 110. The location information about the induction range, the air conditioner, and the laundry machine and the location measurement value measured with respect to an AI speaker that is the second home appliance 140 may be stored in lookup tables 1110, 1120, and 1130 of the server device 110.

According to an embodiment of the disclosure, the server device 110 may compare location measurement values included in the lookup tables 1110, 1120, and 1130 of registered home appliances, stored in the server device 110, with a location measurement value 1140 of the user equipment 130 and determine that the user equipment 130 is located closest to the induction range. In this case, the server device 110 may determine location information 1150 of the user equipment 130 as the kitchen that is the location information about the induction range.

According to an embodiment of the disclosure, the server device 110 may determine the location information about the user equipment 130, considering the registered home appliance and a line of sight indicating whether an obstacle exists on the linear path of the AI speaker that is the second home appliance 140. For example, referring to FIG. 11, the laundry machine may be installed in the laundry room, and a wall may exist between the AI speaker and the laundry machine. In this case, information indicating whether an obstacle exists in the location measurement value of the laundry machine may be a value indicating that "an obstacle exists". Thus, when the line of sight indicating whether the obstacle exists in the location measurement value of the user equipment 130 indicates that "no obstacle exists", then it is highly likely that the location information about the user equipment 130 is not the laundry room.

Figure 12:
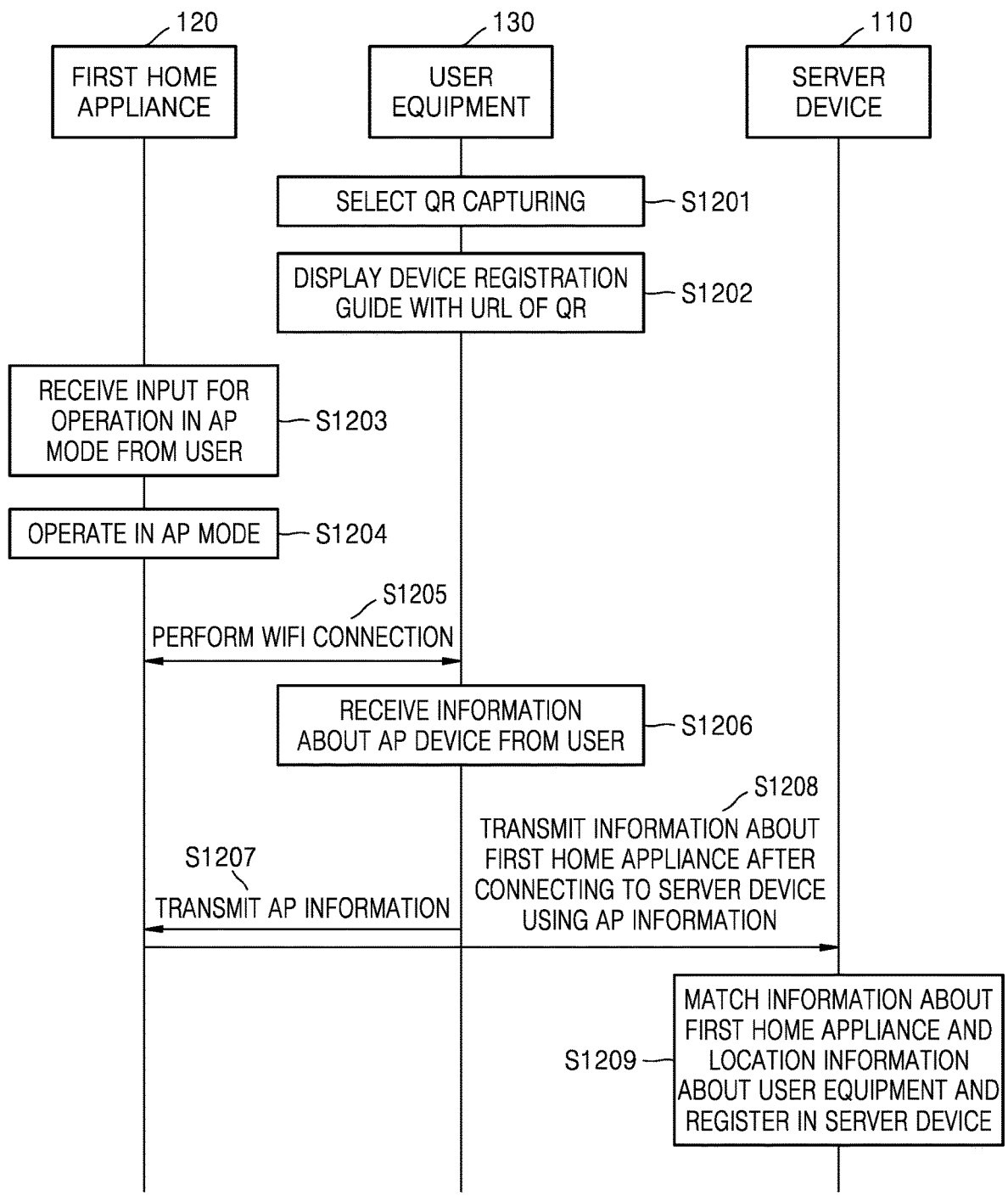
FIG. 12 is a sequence diagram illustrating a method, performed by a server device in cooperation with other devices, of receiving information about a first home appliance according to an embodiment of the disclosure.

FIG. 12 is a sequence diagram illustrating a method, performed by a server device in cooperation with other devices, of receiving information about a first home appliance according to an embodiment of the disclosure.

In the series of processes illustrated in FIG. 12, the user equipment 130 is provided with a guide for registering the first home appliance 120 in the server device 110 by capturing the QR code attached to the front surface of the first home appliance 120, and registers the first home appliance 120 in the server device 110 based on the provided guide.

According to an embodiment of the disclosure, to register the first home appliance 120 in the server device 110, information about the first home appliance 120 has to be transmitted to the server device 110.

In operation S1201, the user equipment 130, according to an embodiment of the disclosure, may receive the user input to capture the QR code attached to the front surface of the first home appliance 120. The user equipment 130 may display a camera GUI for capturing the QR code when receiving the user input to select the QR capturing menu in the device registration GUI. The user may capture the QR code attached onto the front surface of the first home appliance 120 by using the camera GUI displayed on the user equipment 130.

In operation S1202, the user equipment 130, according to an embodiment of the disclosure, may display a device registration guide by using an URL of the QR code. The user equipment 130 according to an embodiment of the disclosure may identify an URL address in the captured QR code. The user equipment 130 may display a device registration guide included in the identified URL address on the user equipment 130. In this case, the device registration guide may include a manipulation method of the first home appliance 120 for switching the first home appliance 120 to the network connection mode. For example, when the first home appliance 120 is a laundry machine, a WiFi button on the front surface of the laundry machine needs to be pressed to switch the laundry machine to the network connection mode. In this case, the device registration guide may include information indicating that a user input to press a WiFi button of the laundry machine for several seconds is required.

In operation S1203, the first home appliance 120, according to an embodiment of the disclosure, may receive a user input to operate in an AP mode. The user input, according to an embodiment of the disclosure, may be an input to press a certain button of the first home appliance 120 for switching of the first home appliance 120 to the network connection mode that is the AP mode. For example, when the first home appliance 120 is the laundry machine, a user input to select a WiFi button on the front surface of the laundry machine may have to be received to switch the laundry machine to the network connection mode that is the AP mode.

In operation S1204, the first home appliance 120, according to an embodiment of the disclosure, may operate in the AP mode in response to the user input. The first home appliance 120, according to an embodiment of the disclosure, may use a soft AP to allow the first home appliance 120 to be recognized as a virtual AP, so as to establish WiFi communication with the user equipment 130. When the first home appliance 120, according to an embodiment of the disclosure, receives the user input to operate in the AP mode, the first home appliance 120 may operate the soft AP by using the WiFi module.

In operation S1205, according to an embodiment of the disclosure, WiFi communication may be established between the first home appliance 120 and the user equipment 130. The user equipment 130, according to an embodiment of the disclosure may connect to the soft AP of the first home appliance 120 to establish WiFi communication connection with the first home appliance 120, and perform WiFi communication with the first home appliance 120. By using the soft AP according to an embodiment of the disclosure, WiFi communication connection established between the user equipment 130 and the first home appliance 120 may correspond to a WiFi Direct scheme.

In operation S1206, the user equipment 130 according to an embodiment of the disclosure may receive information about the AP device 150 from the user. The information about the AP device 150 according to an embodiment of the disclosure may include an SSID of the AP device 150, and an ID, a password, an authentication scheme, an encryption method, and an authentication key, etc., of the AP device 150. In operation S1207, the user equipment 130, according to an embodiment of the disclosure, may transmit the received information about the AP device 150 to the first home appliance 120.

In operation S1208, the first home appliance 120, according to an embodiment of the disclosure, may connect to the server device 110 by using the received information about the AP device 150, and then may transmit the information about the first home appliance 120 to the server device 110. The first home appliance 120, according to an embodiment of the disclosure, may connect to the AP device 150 by using the information (the ID, password, etc.) of the AP device 150, and connect to the server device 110 through the Internet connected to the AP device 150. The information about the first home appliance 120, according to an embodiment of the disclosure, may be information including a product name, a product serial number, a manufacturing date, etc., of the first home appliance 120. The information about the first home appliance 120 may lack information related to the location of the first home appliance 120.

In operation S1209, the server device 110, according to an embodiment of the disclosure, may match the received information about the first home appliance 120 and the location information about the user equipment 130, and register the first home appliance 120 in the server device 110. According to an embodiment of the disclosure, when the user registers the first home appliance 120 in the server device 110, the user may use the location information about the user equipment 130 as the location information about the first home appliance 120 because the user equipment 130 is located at a distance very close to the first home appliance 120. According to an embodiment of the disclosure, the server device 110 may update registered-home-appliance location information lookup table by matching the information about the first home appliance 120 and the location information about the user equipment 130 simultaneously with registering the first home appliance 120 in the server device 110.

Figure 13:
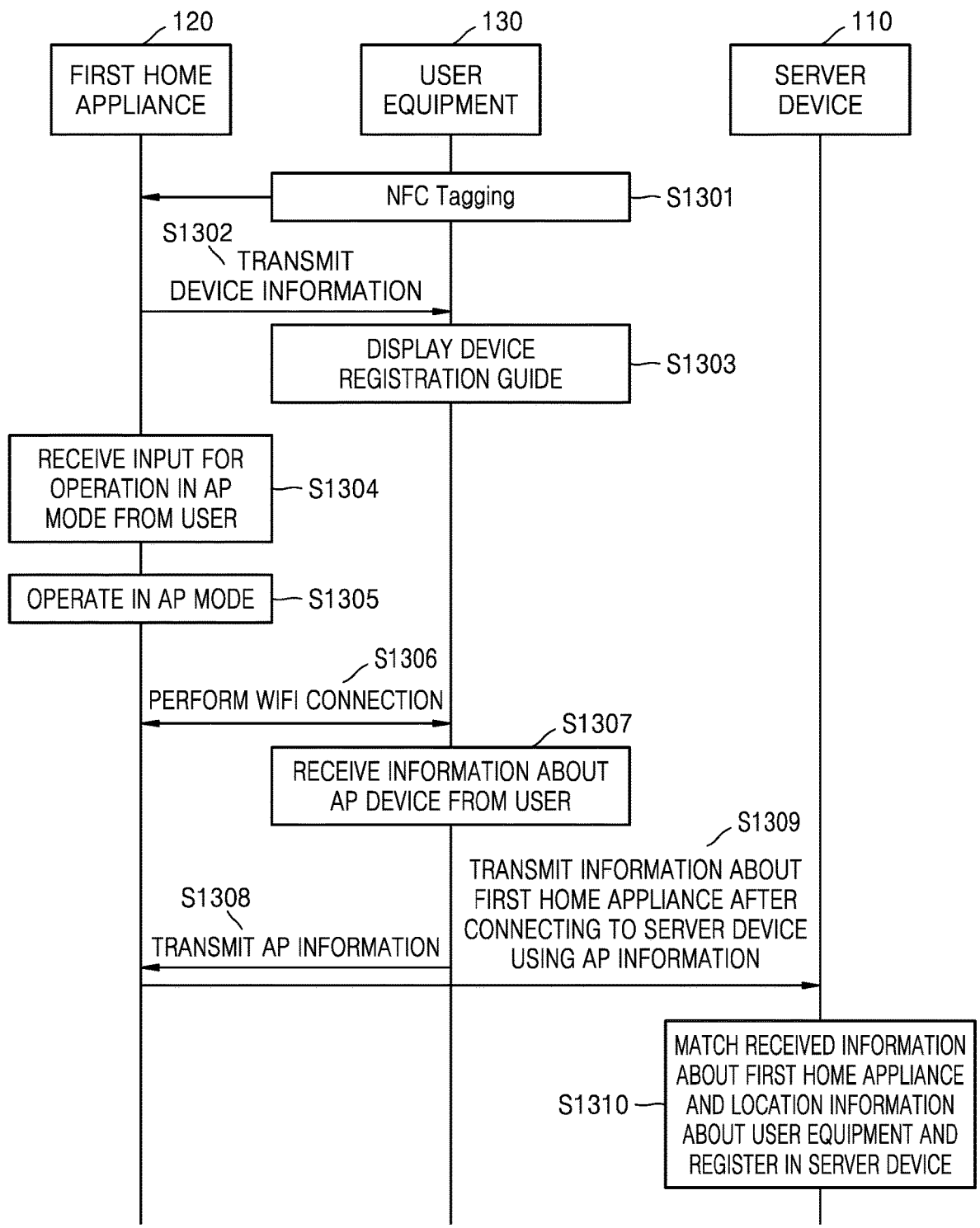
FIG. 13 is a sequence diagram illustrating another method, performed by a server device in cooperation with other devices, of receiving information about a first home appliance according to an embodiment of the disclosure.

FIG. 13 is sequence diagram illustrating another method, performed by a server device in cooperation with other devices, of receiving information about a first home appliance according to an embodiment of the disclosure.

In the series of processes illustrated in FIG. 13, a guide for registering the first home appliance 120 in the server device 110 is provided using an NFC scheme by locating the user equipment 130 close to the NFC tag region of the first home appliance 120, and the first home appliance 120 is registered based on the provided guide.

According to an embodiment of the disclosure, to register the first home appliance 120 in the server device 110, information about the first home appliance 120 has to be transmitted to the server device 110.

In operation S1301, the user equipment 130, according to an embodiment of the disclosure, may perform NFC tagging and transmit, to the first home appliance 120, information indicating that NFC tagging is performed. According to an embodiment of the disclosure, the user equipment 130 may establish NFC communication with the first home appliance 120 as the user equipment 130 is located adjacent to the NFC tag region included in the first home appliance 120.

In operation S1302, the first home appliance 120, according to an embodiment of the disclosure, may transmit device information to the user equipment 130. According to an embodiment of the disclosure, the device information may include the manipulation method of the first home appliance 120 for switching the first home appliance 120 to the network connection mode. According to an embodiment of the disclosure, the first home appliance 120 may transmit the device information to the user equipment 130 through NFC communication established with the user equipment 130.

In operation S1303, the user equipment 130, according to an embodiment of the disclosure, may display the device registration guide. The device registration guide, according to an embodiment of the disclosure, may be a guide including the manipulation method of the first home appliance 120 for switching the first home appliance 120 to the network connection mode. The user equipment 130 may display the device registration guide on the display of the user equipment 130.

A description of operations S1304 to S1310 is the same as a description of operations S1203 to S1209 of FIG. 12, and thus will be omitted.

Figure 14A:
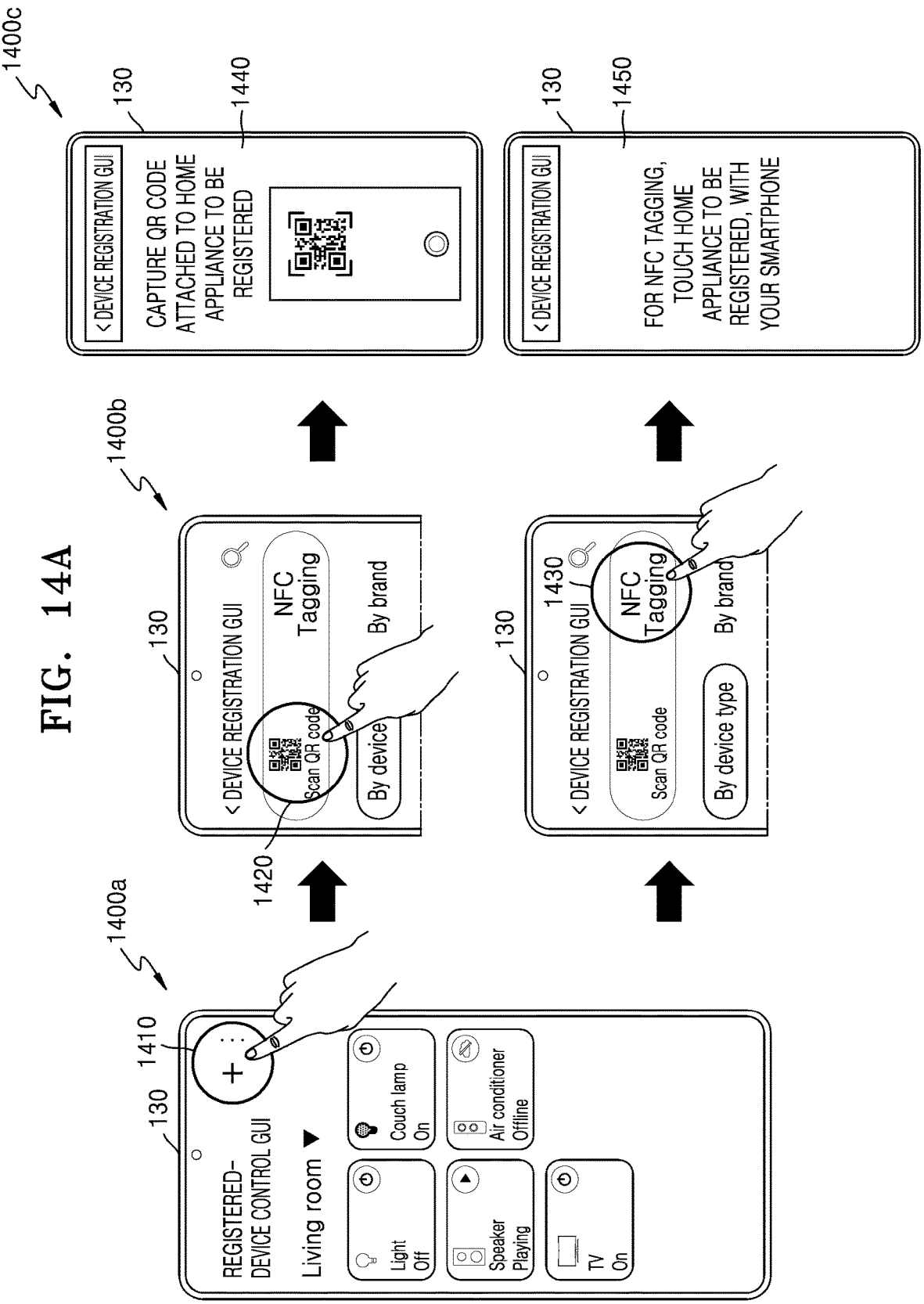
FIGS. 14A and 14B depict illustrative examples of operation of a graphical user interface (GUI) provided by a server device to a user equipment to register a first home appliance in a certain account, according to an embodiment of the disclosure.
Figure 14B:
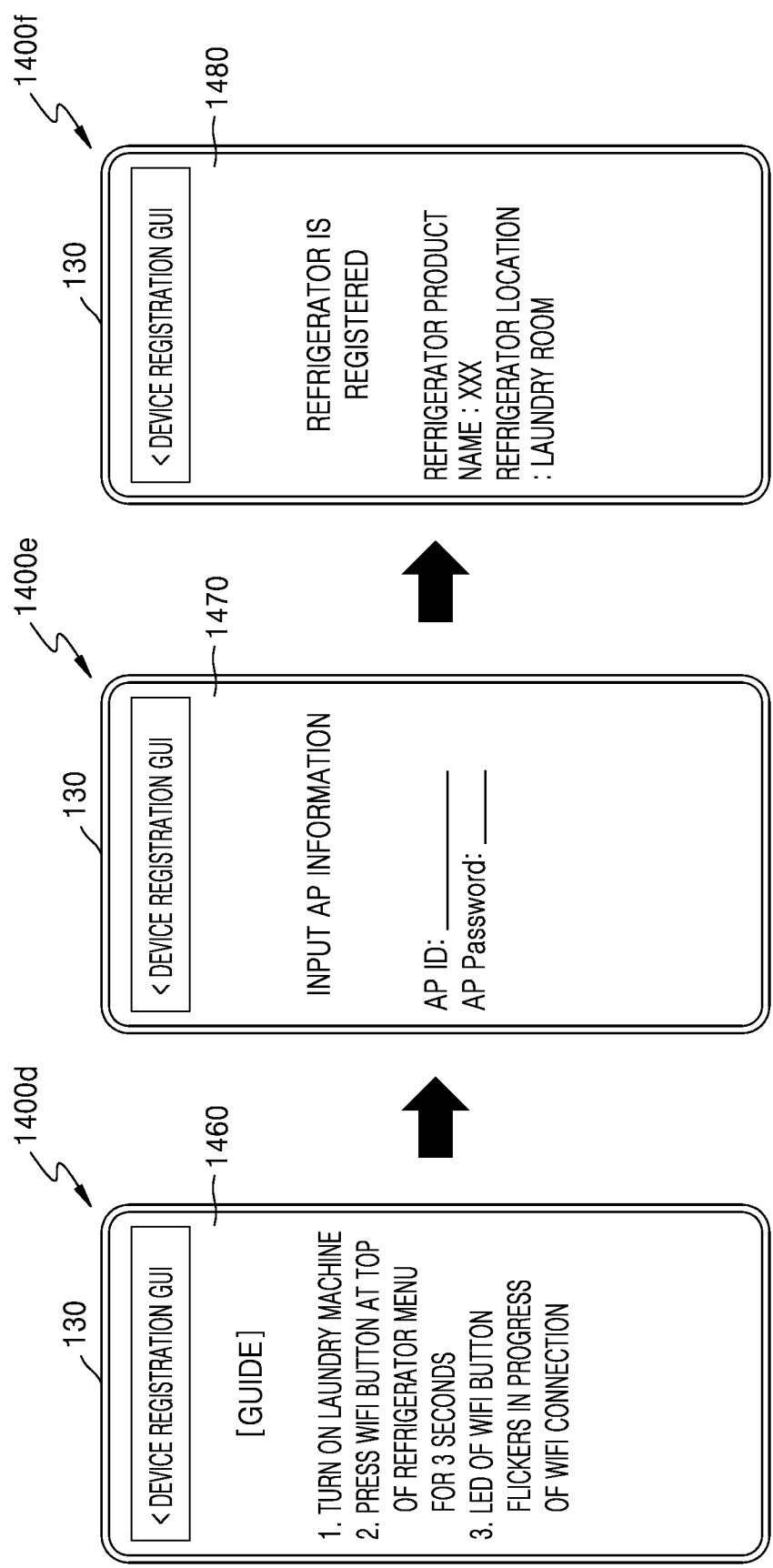

FIGS. 14A and 14B depict illustrative examples of operation of a GUI provided by a server device to a user equipment to register a first home appliance in a certain account, according to an embodiment of the disclosure.

Referring to an illustrative scenario 1400a depicted in FIG. 14A, the user equipment 130 may display the registered-device control GUI on the display. According to an embodiment of the disclosure, the user equipment 130 may receive a user input to control registered home appliances through the registered-device control GUI. Referring to the illustrative scenario 1400a of FIG. 14, the registered-device control GUI may display a list of the registered home appliances (e.g., an illuminating device, a speaker device, an air conditioner, and a TV), and the user may control a home appliance by selecting the home appliance to be controlled from the list. According to an embodiment of the disclosure, the user equipment 130 may receive a user input to register a new home appliance through the registered-device control GUI. According to an embodiment of the disclosure, the user equipment 130 may provide the device registration GUI for device registration to the user by receiving a user input to select a plus button 1410 that is a certain button displayed on the registered-device control GUI.

Referring to an illustrative scenario 1400b depicted in FIG. 14A, the user equipment 130 may display the device registration GUI on the display. According to an embodiment of the disclosure, the device registration GUI may include a QR code capturing menu 420 or an NFC tagging menu 1430. The user may select the QR code capturing menu 1420 or the NFC tagging menu 1430, displayed on the device registration GUI, thereby starting a series of processes for registering a home appliance in the server device 110. When a QR code is attached to a home appliance to be registered, the user may be provided with a guide for home appliance registration by capturing the QR code attached to the home appliance with the user equipment 130. Thus, in this case, in the device registration GUI, the QR code capturing menu 1420 may be selected. When an NFC tag region is included in the home appliance to be registered, the user may be provided with a guide for home appliance registration by locating the user equipment 130 in adjacent to the NFC tag region. Thus, in this case, in the device registration GUI, the NFC tagging menu 1430 may be selected.

Referring to an illustrative scenario 1400c depicted in FIG. 14A, the user equipment 130 may display an interface 1440 for capturing a QR code in response to reception of a user input to select the QR code capturing menu 1420. The interface 1440 for capturing the QR code may display a camera screen for capturing the QR code, together with a guide phrase such as "Capture the QR code attached to the home appliance to be registered". The user may capture the QR code attached to the home appliance by using the camera screen.

Referring to the illustrative scenario 1400c of FIG. 14A, the user equipment 130 may display an interface 1450 for NFC tagging in response to reception of a user input to select the NFC tagging menu 1430. The interface 1450 for NFC tagging may display a guide phrase such as "For NFC tagging, touch the home appliance to be registered, with your smartphone". By placing the user equipment 130 adjacent to an NFC tag region of the home appliance to be registered, the user may induce NFC tagging between the user equipment 130 and the home appliance.

Referring to an illustrative scenario 1400d depicted in FIG. 14B, the user equipment 130 may display a device registration guide 1460. When the user captures a QR code of the home appliance to be registered using the user equipment 130, the user equipment 130 may identify an URL address from the captured QR code. The user equipment 130 may display the device registration guide included in the identified URL address. When the user locates the user equipment 130 on the NFC tag region of the home appliance, the user equipment 130 may be provided with the device registration guide 1460 from the home appliance through NFC communication established with the home appliance. The user equipment 130 may display the provided device registration guide 1460. For example, when the home appliance to be registered is the laundry machine, the device registration guide 1460 may include a manipulation method of the laundry machine to register the laundry machine in the server device 110. At this time, the device registration guide 1460 may include a guide such as "Turn on the laundry machine and press the WiFi button at the top of the menu of the laundry machine for 3 seconds".

Referring to an illustrative scenario 1400e depicted in FIG. 14B, the user equipment 130 may display an interface 1470 for receiving AP information. According to an embodiment of the disclosure, when the home appliance to be registered receives the user input and operates in the AP mode, WiFi communication may be established between the user equipment 130 and the home appliance. In this case, to enable the home appliance to be registered to connect to the server device 110, the user has to provide information about the AP device 150. Thus, when the user equipment 130 determines that the home appliance operates in the AP mode and WiFi communication is established between the home appliance and the user equipment 130, the user equipment 130 may display the interface 1470 for receiving a user input with respect to the information about the AP device 150. The user may provide information for connecting to the AP device 150 to the home appliance, by inputting the ID and password of the AP device 150.

According to an embodiment of the disclosure, the home appliance, having received the information about the AP device 150, may connect to the AP device 150 and connect to the server device 110 through the Internet connected to the AP device 150. The home appliance, according to an embodiment of the disclosure, may connect to the server device 110, provide information about the home appliance (e.g. a product name, a serial number, and a manufacturing date of the home appliance), and register the home appliance in the server device 110. In this case, the information about the home appliance does not include information related to the location of the home appliance, but the server device 110 may use location information about the user equipment 130 transmitted from a UWB device (e.g. the second home appliance 140) existing in the house as the information about the home appliance.

Referring to an illustrative scenario 1400f depicted in FIG. 14B, the user equipment 130 may display an interface 1480 indicating that the home appliance is registered. For example, when the laundry machine is registered, the interface 1480 may show a product name and a location of the laundry machine.

FIG. 15 is a sequence diagram illustrating a method, performed by a server device in cooperation with other devices, of providing a registered-home appliance control GUI to a user equipment, according to an embodiment of the disclosure.

According to an embodiment of the disclosure, the user may control the home appliance registered in the server device 110 through the registered-device control GUI displayed on the user equipment 130. When the UWB sensor of the user equipment 130 is already activated, the location of the user equipment 130 may be measured. The server device 110 may determine a third home appliance toward which the user equipment 130 is oriented, based on the measured location of the user equipment 130, and provide a GUI for controlling the third home appliance to the user equipment 130.

The user equipment 130 according to an embodiment of the disclosure may receive a user input to select a UWB icon in operation S1501, and the user equipment 130 may transmit a control GUI request signal to the server device 110 in operation S1502.

Figure 16:
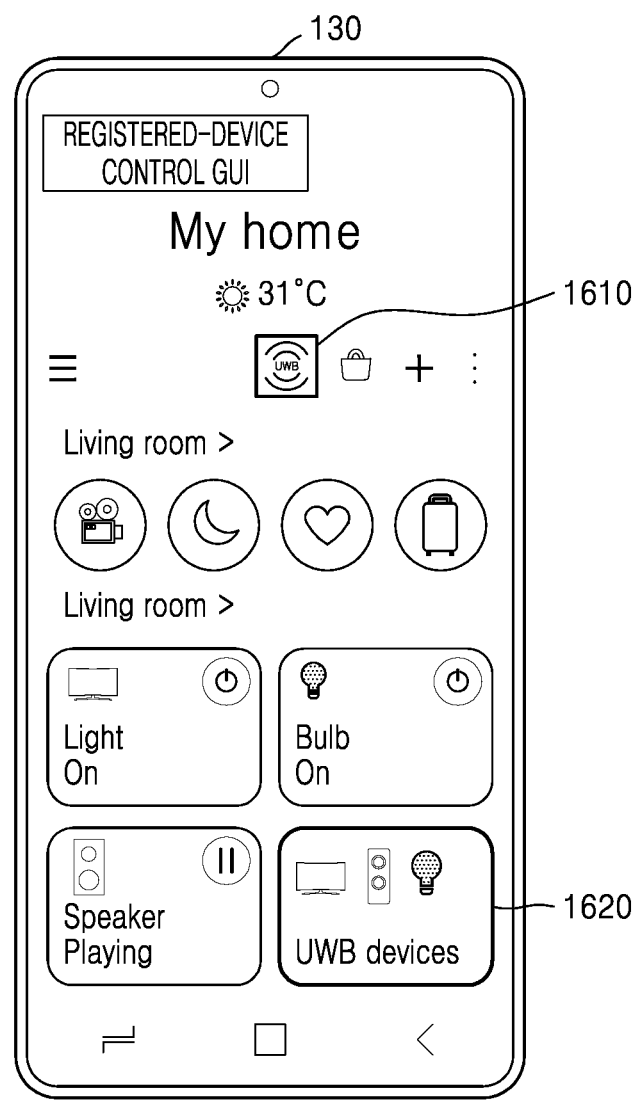
FIG. 16 depicts an illustrative example of a registered-device control GUI displayed by a user equipment, according to an embodiment of the disclosure.

Referring to an illustrative example of a GUI depicted in FIG. 16, the user equipment 130, according to an embodiment of the disclosure, may transmit the control GUI request signal to the server device 110 by receiving a user input to select a UWB icon 1610 displayed on the registered-device control GUI. The user equipment 130, according to another embodiment of the disclosure, may transmit the control GUI request signal to the server device 110 by receiving a user input to select a "UWB Device" icon 1620 from a list of registered home appliances, displayed on the registered-device control GUI. The user equipment 130, according to another embodiment of the disclosure, may transmit the control GUI request signal to the server device 110 by receiving a user input to pull down an upper bar of the user equipment 130 and to select a "UWB Device" icon displayed on the upper bar.

In operations S1503 and S1504, the server device 110, according to an embodiment of the disclosure, may transmit the UWB communication module activation signal to the user equipment 130 and the second home appliance 140. According to an embodiment of the disclosure, the UWB communication module activation signal may be a signal for activating sensors of the UWB antennas respectively included in the user equipment 130 and the second home appliance 140 to exchange UWB signals with the user equipment 130 and the second home appliance 140.

In operation S1505, the user equipment 130, according to an embodiment of the disclosure, may transmit the location identification request signal to the second home appliance 140. According to an embodiment of the disclosure, the location identification request signal may be a UWB signal transmitted from the UWB antenna included in the user equipment 130 to the UWB antenna included in the second home appliance 140.

In operation S1506, the second home appliance 140, according to an embodiment of the disclosure, may measure the location measurement value of the user equipment 130 based on the UWB signal that is the location identification request signal. The location measurement value of the user equipment 130, according to an embodiment of the disclosure, may include azimuth information and elevation information about the user equipment 130 measured with respect to the second home appliance 140 and distance information between the second home appliance 140 and the user equipment 130. The location measurement value of the user equipment 130 may include information about a direction in which the user equipment 130 is oriented.

The second home appliance 140, according to an embodiment of the disclosure, may determine the location measurement value of the user equipment 130 in operation S1507 and transmit the location measurement value of the user equipment 130 to the server device 110 in operation S1508.

In operation S1509, the server device 110, according to an embodiment of the disclosure, may determine a third home appliance toward which the user equipment 130 is oriented, based on the registered-home-appliance location information lookup table. The server device 110, according to an embodiment of the disclosure, may compare location measurement values of home appliances, included in the registered-home-appliance location information lookup table, with the location measurement value of the user equipment 130, to determine the third home appliance toward which the user equipment is oriented. The server device 110 may determine the third home appliance that is a home appliance toward which the user equipment 130 is oriented, among the registered home appliances, based on a direction of the user equipment 130 included in the location measurement value and a difference in location measurement value between the user equipment 130 and the home appliances.

In operation S1510, the server device 110, according to an embodiment of the disclosure, may select a GUI screen for controlling the determined third home appliance from a GUI list for controlling the registered home appliances. According to an embodiment of the disclosure, the GUI list for controlling the registered home appliances may be information where GUIs that may be provided to the user equipment 130 to control the home appliances registered in the server device 110 are stored. For example, when the user equipment 130 is determined to be oriented toward the air conditioner, the server device 110 may select a GUI for controlling the air conditioner from the GUI list for controlling the registered home appliances.

The server device 110, according to an embodiment of the disclosure, may provide the selected GUI to the user equipment 130 in operation S1511, and the user equipment 130 may display the provided GUI on the display in operation S1512.

In an embodiment of the disclosure, operations S1508 to S1511 are described as being performed by the server device 110, but the disclosure is not limited thereto. That is, the second home appliance 140 may transmit the location measurement value of the user equipment 130 to the user equipment 130. Thereafter, the user equipment 130 may determine the home appliance toward which the user equipment 130 is oriented, based on the registered-home-appliance location information lookup table, stored in the user equipment 130. Thereafter, the user equipment 130 may display a GUI screen for controlling the determined home appliance thereon.

Figure 17:
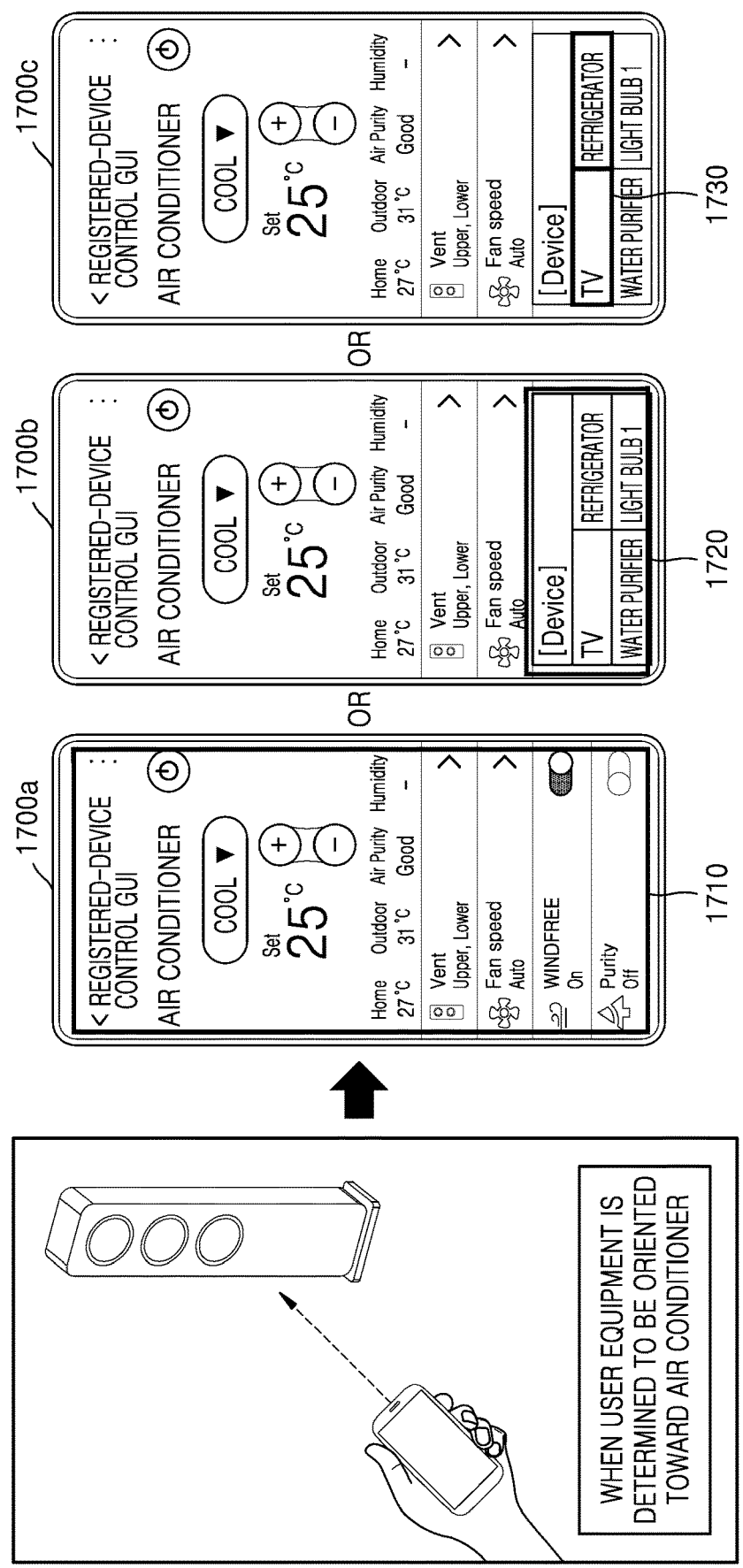
FIG. 17 depicts an illustrative example of a home appliance control GUI, displayed by a user equipment, according to an embodiment of the disclosure.

FIG. 17 depicts an illustrative example of a home appliance control GUI, displayed by a user equipment, according to an embodiment of the disclosure.

Referring to FIG. 17, the user equipment 130, according to an embodiment of the disclosure, may display a GUI for controlling the home appliance toward which the user equipment 130 is determined to be oriented, on the display. Hereinbelow, a description will be made on the assumption that the user equipment 130 is oriented toward the air conditioner among the home appliances registered in the server device 110.

Referring to an illustrative scenario 1700*a* depicted in FIG. 17, the user equipment 130, according to an embodiment of the disclosure, may provide, to the user, an air conditioner control GUI for controlling the air conditioner toward which the user equipment 130 is oriented. According to an embodiment of the disclosure, the user may control the current temperature of the air conditioner, control a mode (a cooling mode or a dehumidifying mode) of the air conditioner, obtain information related to the current temperature, control a speed of a fan of the air conditioner, control ON/OFF of a windless mode of the air conditioner, etc., through an air conditioner control GUI 1710.

Referring to an illustrative scenario 1700*b* depicted in FIG. 17, the user equipment 130, according to an embodiment of the disclosure, may display information 1720 related to other peripheral devices under the air conditioner control GUI 1710 for controlling the air conditioner toward which the user equipment 130 is determined to be oriented. The information 1720 related to the other peripheral devices may be a text or an image indicating a device name, a device type, etc. In this case, the user equipment 130 may display the information 1720 related to the other peripheral devices as default settings, but may display the information 1720 related to the other peripheral devices when the user inputs a drag input under a screen of the air conditioner control GUI 1710. The information 1720 related to the other peripheral devices may include a list of home appliances, which are registered in the server device 110 and have location measurement values measured with respect to a UWB device and stored in the server device 110. The user may select a home appliance included in the information 1720 related to the other peripheral devices, thus being provided with a GUI for controlling the home appliance. For example, even when the current air conditioner control GUI 1710 is displayed on the user equipment 130, the user may select a TV from the information 1720 related to the other peripheral devices at the bottom, thus being provided with a GUI for controlling the TV.

Referring to an illustrative scenario 1700*c* depicted in FIG. 17, the user equipment 130, according to an embodiment of the disclosure, may display the other peripheral devices as indicated by 1730 under the air conditioner control GUI 1710, taking account of location measurement values of the other peripheral devices with respect to the UWB device. In this case, a home appliance located adjacent to the direction in which the user equipment 130 is oriented may be displayed in bold or in a large font, and a home appliance located in a direction far from the direction in which the user equipment 130 is oriented may be displayed in a default font or displayed small. For example, while the user equipment 130 is determined to be oriented toward the air conditioner and thus the air conditioner control GUI 1710 is mainly provided, when the user equipment 130 is determined to be located in a direction adjacent to the TV and the refrigerator, then the TV and the refrigerator may be displayed in bold or in large fonts when compared to a water purifier and a light bulb device.

Figure 18:
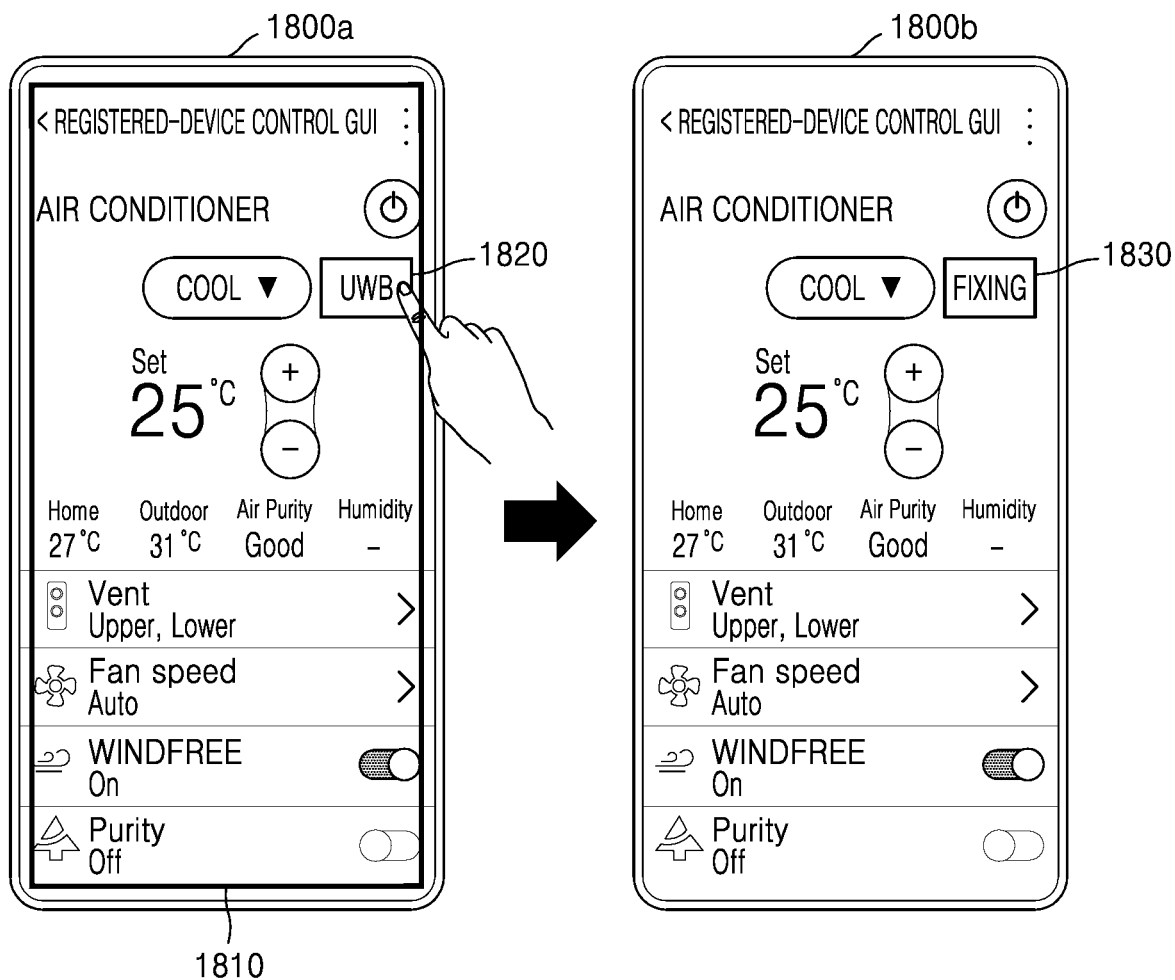
FIG. 18 depicts an illustrative example of operation of a method, performed by a user terminal, of providing a UWB mode and a fixed mode in a registered-device control GUI, according to an embodiment of the disclosure.

FIG. 18 depicts an illustrative example of operation of a method, performed by the user equipment 130, of providing a UWB mode and a fixed mode in a registered-device control GUI, according to an embodiment of the disclosure.

Referring to an illustrative scenario 1800*a* depicted in FIG. 18, an air conditioner control GUI 1810 may include a UWB icon 1820 for an operation in the UWB mode. When the UWB icon 1820 is displayed on the air conditioner control GUI 1810, a to-be-controlled-home appliance GUI may change with a direction in which the user equipment 130 is oriented. For example, when the direction of the user equipment 130 is changed from the direction in which the user equipment 130 is oriented toward the air conditioner to the direction in which the user equipment 130 is oriented toward the TV, the user equipment 130 may change from the air conditioner control GUI 1810 to a TV control GUI and provide the TV control GUI to the user.

Referring to an illustrative scenario 1800*b* depicted in FIG. 18, the air conditioner control GUI 1810 for controlling the air conditioner may include a fixing icon 1830 for an operation in the fixed mode. Upon receiving an input to touch the UWB icon 1820 from the user, the user equipment 130, according to an embodiment of the disclosure, may change the UWB icon 1820 to the fixing icon 1830 and provide the air conditioner control GUI 1810 in the fixed mode. The user equipment 130, according to an embodiment of the disclosure, may receive a particular gesture or a particular voice command as well as a user input to touch the UWB icon 1820, thereby changing the UWB icon 1820 to the fixing icon 1830. According to an embodiment of the disclosure, when the air conditioner control GUI 1810 is changed to the fixed mode, the user equipment 130 may fixedly display an existing to-be-controlled-home appliance GUI even in the case that the direction in which the user equipment 130 is oriented is changed. For example, when the air conditioner control GUI 1810 is in the fixed mode, the user equipment 130 may fixedly provide the air conditioner control GUI 1810 even in the case that the user changes the direction of the user equipment 130 from the direction in which the user equipment 130 is oriented toward the air conditioner to the direction in which the user equipment 130 is oriented toward the TV.

According to an embodiment of the disclosure, the user equipment 130 may automatically switch the device control GUI from the UWB mode to the fixed mode. When receiving a touch input to control a device by using the device control GUI from the user, the user equipment 130, according to an embodiment of the disclosure, may determine that the user is to continue device control, and automatically switch from the UWB mode to the fixed mode. For example, when the user controls the temperature of the air conditioner by using the air conditioner control GUI 1810, the user equipment 130 may determine that the user continues to control the air conditioner, and automatically switch the air conditioner control GUI 1810 to the fixed mode.

According to an embodiment of the disclosure, the user equipment 130 may automatically switch the device control GUI from the fixed mode to the UWB mode. When the user equipment 130, according to an embodiment of the disclosure, does not receive any input from the user for a specific time, the user equipment 130 may determine that the user is not intending to control the device further, and may automatically switch the device control GUI from the fixed mode to the UWB mode. For example, when the user does not make any manipulation using the air conditioner control GUI 1810, the user equipment 130 may determine that the user is not intending to control the air conditioner further, and may automatically switch the air conditioner control GUI 1810 to the UWB mode.

Figure 19:
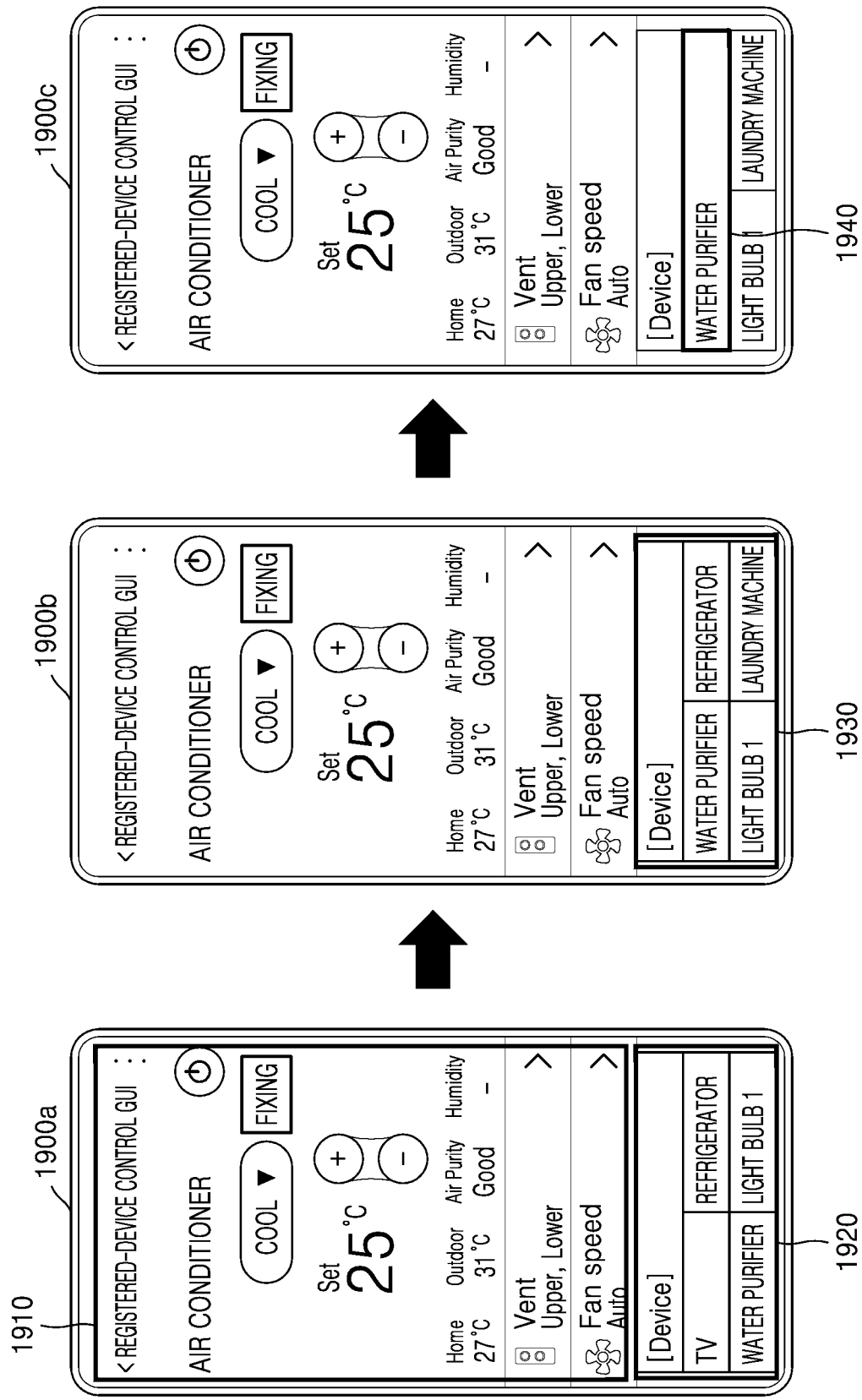
FIG. 19 depicts an illustrative example of operation of a method, performed by a user equipment, of providing information related to a neighboring home appliance in a fixed mode, according to an embodiment of the disclosure.

FIG. 19 depicts an illustrative example of operation of a method, performed by a user equipment, of providing information related to a neighboring home appliance in a fixed mode, according to an embodiment of the disclosure.

Referring to an illustrative scenario 1900*a* depicted in FIG. 19, the user equipment 130, according to an embodiment of the disclosure, may display a GUI for controlling the home appliance toward which the user equipment 130 is determined to be oriented. When the user equipment 130 is determined to be oriented toward the air conditioner, the user equipment 130 may display an air conditioner control GUI 1910. The user equipment 130, according to an embodiment of the disclosure, may provide the air conditioner control GUI 1910 in the "fixed mode", and in the fixed mode, a to-be-controlled home appliance GUI may continue to provide the air conditioner control GUI 1910 even when the direction in which the user equipment 130 is oriented is changed. The user equipment 130, according to an embodiment of the disclosure, may provide the air conditioner control GUI 1910 in the fixed mode, and at the same time, display information 1920 related to other peripheral devices under the air conditioner control GUI 1910. The information 1920 related to the other peripheral devices may include a list of home appliances, which are registered in the server device 110 and have location measurement values measured with respect to a UWB device and stored in the server device 110. For example, the user equipment 130 may display an icon for selecting a TV, a refrigerator, a water purifier, and a light bulb 1 in the information 1920 related to the other peripheral devices. For example, when the user selects the TV, the user equipment 130 may change the air conditioner control GUI 1910 to a TV control GUI.

Referring to an illustrative scenario 1900*b* depicted in FIG. 19, when the direction in which the user equipment 130 is oriented is changed, the air conditioner control GUI 1910 is not changed, but a list of home appliances included in information 1930 related to the other peripheral devices may be changed. According to an embodiment of the disclosure, in the fixed mode, even when the direction in which the user equipment 130 is oriented is changed, the air conditioner control GUI 1910 that is a main control GUI is not changed. However, according to the direction in which the user equipment 130 is oriented, the information 1930 related to the other peripheral devices may be updated by changing the order of the information 1930 or adding information to or deleting information from the information 1930. For example, when it is determined that the direction in which the user equipment 130 is oriented is closer to the water purifier and farther away from the TV, the information 1930 related to the other peripheral devices may be updated such that the water purifier is changed to a higher order and the TV is deleted.

Referring to an illustrative scenario 1900*c* depicted in FIG. 19, when it becomes clear that the direction in which the user equipment 130 is oriented is toward a particular home appliance, the user equipment 130 may highlight and display the particular home appliance in information 1940 related to the other peripheral devices. For example, when it becomes apparent that the direction in which the user equipment 130 is oriented is toward the water purifier, the air conditioner control GUI 1910 is displayed in the main GUI because of the fixed mode. In this case, the user equipment 130 may highlight and display an icon indicating the water purifier in the information 1940 related to the other peripheral devices.

Figure 20:
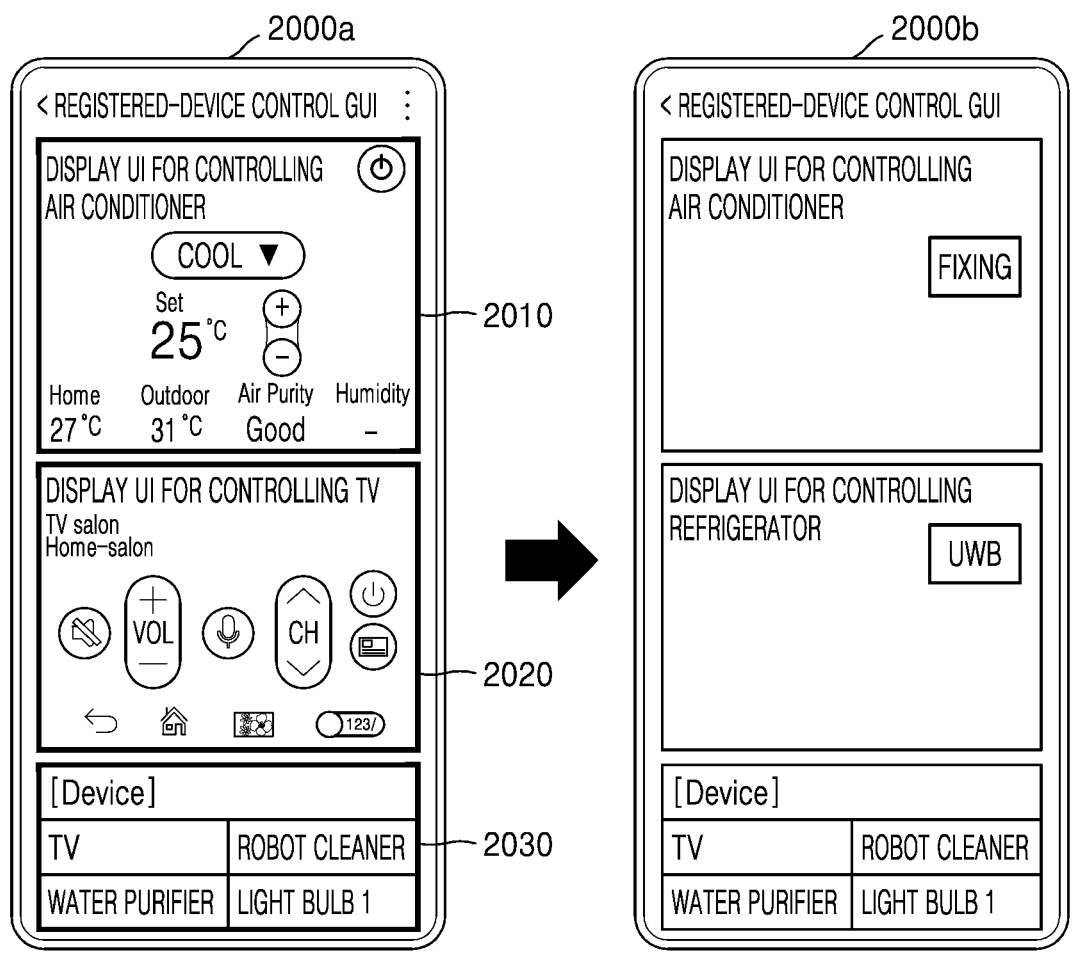
FIG. 20 depicts an illustrative example of operation of a method, performed by a user equipment, of providing a plurality of home appliance control GUIs, according to an embodiment of the disclosure.

FIG. 20 depicts an illustrative example of operation of a method, performed by a user equipment, of providing a plurality of home appliance control GUIs, according to an embodiment of the disclosure.

Referring to an illustrative scenario 2000*a* depicted in FIG. 20, the user equipment 130, according to an embodiment of the disclosure, may simultaneously display a plurality of home appliance control GUIs. When the direction in which the user equipment 130 is oriented is determined as a plurality of home appliances rather than one home appliance, the user equipment 130 may simultaneously display the plurality of home appliance control GUIs. For example, the user equipment 130 may be oriented toward both the air conditioner and the TV. Alternatively, it may be difficult to determine whether the direction in which the user equipment 130 is oriented is the air conditioner or the TV. In this case, the user equipment 130 may display an air conditioner control GUI 2010 and a TV control GUI 2020 at the same time. According to an embodiment of the disclosure, the user may simultaneously control the air conditioner and the TV by using the air conditioner control GUI 2010 and the TV control GUI 2020 displayed on the user equipment 130. The user equipment 130, according to an embodiment of the disclosure, may display information 2030 related to the other peripheral devices under the air conditioner control GUI 2010 and the TV control GUI 2020.

Referring to an illustrative scenario 2000b depicted in FIG. 20, the user equipment 130, according to an embodiment of the disclosure, may provide the air conditioner control GUI 2010 in the fixed mode and the TV control GUI 2020 in the UWB mode. In this case, when the direction in which the user equipment 130 is oriented is changed, the air conditioner control GUI 2010 provided in the fixed mode may continue to be provided. However, the TV control GUI 2020 provided in the UWB mode may be changed to a GUI for controlling a home appliance located in a direction in which the user equipment 130 is actually oriented.

Figure 21:
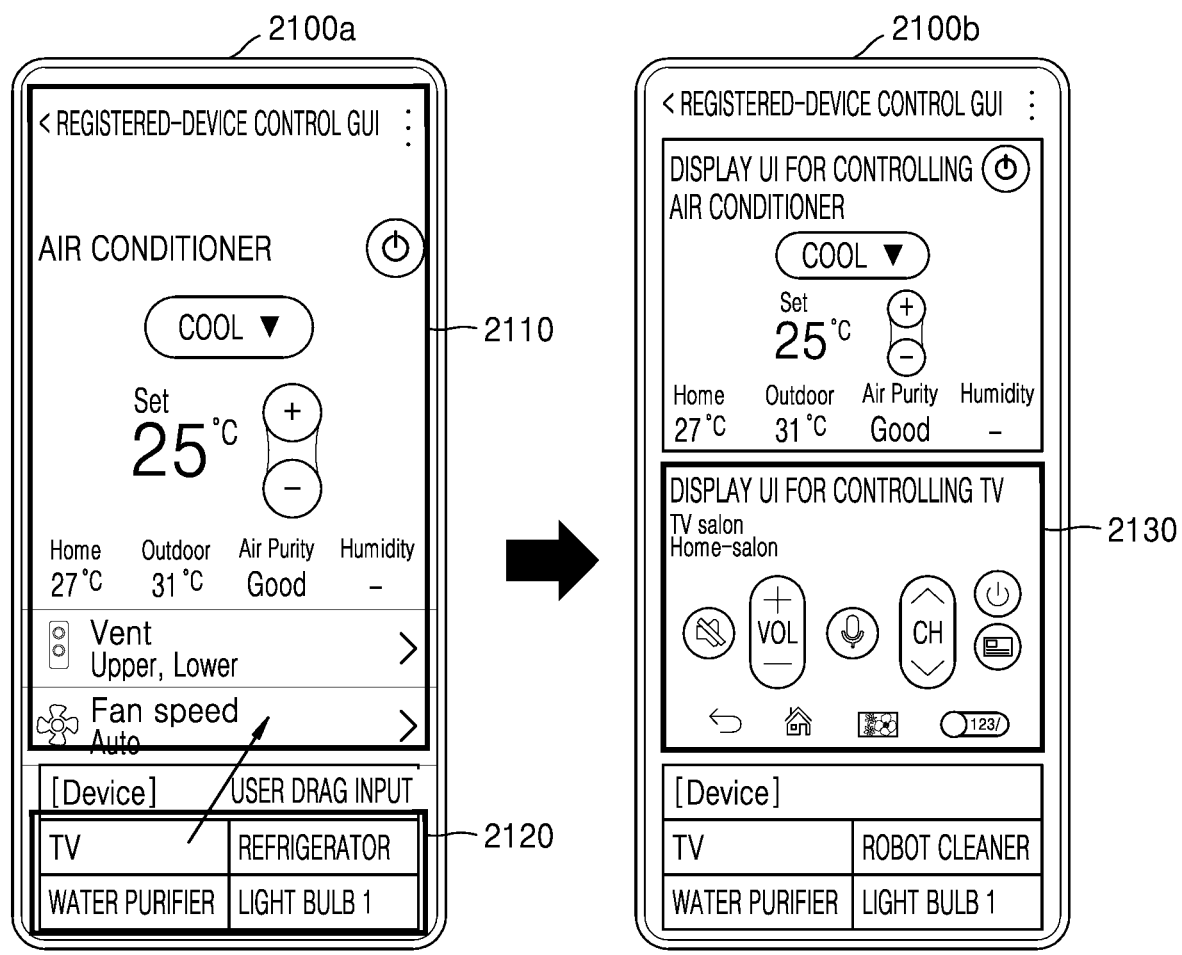
FIG. 21 depicts another illustrative example of operation of a method, performed by a user equipment, of providing a plurality of home appliance control GUIs, according to an embodiment of the disclosure.

FIG. 21 depicts another illustrative example of operation of a method, performed by a user equipment, of providing a plurality of home appliance control GUIs, according to an embodiment of the disclosure.

Referring to an illustrative scenario 2100a depicted in FIG. 21, the user equipment 130 may display an air conditioner control GUI 2110 and information 2120 related to the other peripheral devices. According to an embodiment of the disclosure, the user equipment 130 may receive an input to drag a particular home appliance icon to a main screen in the information 2120 related to the other peripheral devices. For example, the user may desire to control the air conditioner and the TV at the same time. In this case, the user may desire to display the air conditioner control GUI 2010 and a TV control GUI at the same time on the user equipment 130. According to an embodiment of the disclosure, the user may be provided with the TV control GUI by dragging a TV icon included in the information 2120 related to the other peripheral devices to the main screen.

Referring to an illustrative scenario 2100b depicted in FIG. 21, the user equipment 130 may display the air conditioner control GUI 2110 at the top and a TV control GUI 2130 at the bottom. According to an embodiment of the disclosure, in response to an input to drag the TV icon from the user, the TV control GUI 2130 may be displayed under the air conditioner control GUI 2110. In this case, the order of a GUI screen displayed in an upper end and a GUI screen displayed in a lower end may be changed according to a user's drag input. For example, when the user desires to display the TV control GUI 2130 in the upper end, the user may drag the TV control GUI 2130 to the upper end while selecting the TV control GUI 2130. In this case, the TV control GUI 2130 may be displayed in the upper end and the air conditioner control GUI 2110 may be displayed in the lower end.

Figure 22:
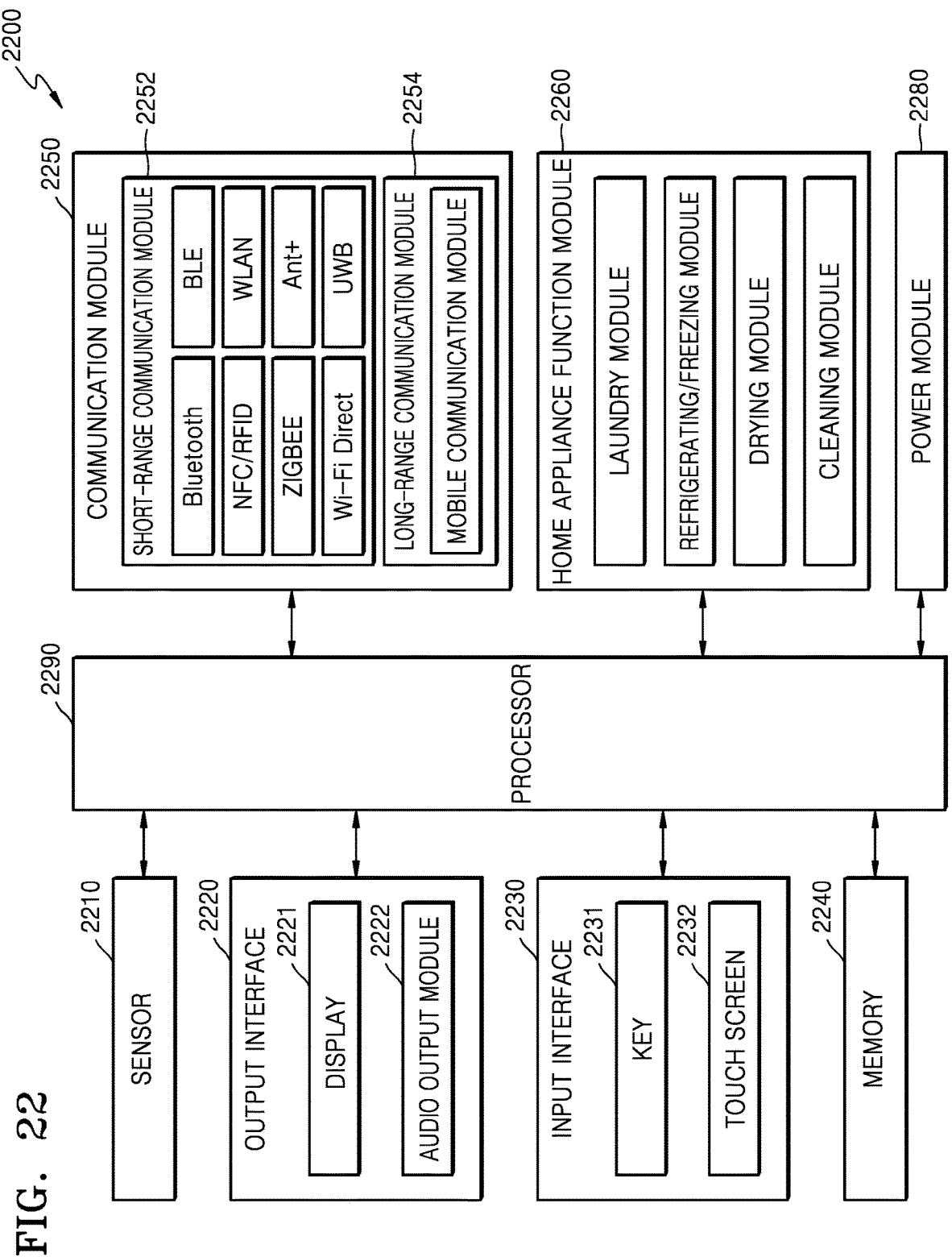
FIG. 22 is a block diagram illustrating structures of a first home appliance and a second home appliance according to an embodiment of the disclosure.

FIG. 22 is a block diagram illustrating structures of a first home appliance and a second home appliance according to an embodiment of the disclosure.

The first home appliance 120 and the second home appliance 140, according to an embodiment of the disclosure, may each correspond to a home appliance 2200. The home appliance 2200, according to an embodiment of the disclosure, may include a sensor 2210, an output interface 2220, an input interface 2230, a memory 2240, a communication module 2250, a home appliance function module 2260, a power module 2280, and a processor 2290. The home appliance 2200 may include various combinations of components shown in FIG. 22, and all the components shown in FIG. 22 are not essential components.

The home appliance 2200 of FIG. 22 may correspond to the second home appliance 140 described with reference to FIG. 3, the memory 2240 may correspond to the memory 326 described with reference to FIG. 3, the processor 1590 may correspond to the processor 320 described with reference to FIG. 3, and the communication module 2250 may correspond to the communication module 322 described with reference to FIG. 3.

The sensor 2210 may include various types of sensors, for example, an image sensor, an infrared sensor, an ultrasonic sensor, a lidar sensor, a human detection sensor, a motion detection sensor, a proximity sensor, an illuminance sensor, etc. A function of each sensor may be intuitively construed from a name of the sensor by those of ordinary skill in the art, and thus will not be described in detail.

The output interface 2220 may include a display 2221, an audio output module 2222, etc. The output interface 2220 may output various notifications, messages, information, etc., generated by the processor 2290.

The input interface 2230 may include a key 2231, a touch screen 2232, etc. The input interface 2230 may receive a user input and transmit the same to the processor 2290.

The memory 2240 may store various information, data, an instruction, a program, etc., required for an operation of the home appliance 2200. The memory 2240 may include at least one of volatile memory or non-volatile memory, or a combination thereof. The memory 2240 may include a storage medium of at least one type of a flash memory type, a hard disk type, a multimedia card micro type, a card type memory (e.g., a secure digital (SD) or extreme digital (XD) memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk. Moreover, the home appliance 2200 may operate a web storage or a cloud server that performs a storage function on the Internet.

The communication module 2250 may include at least one of a short-range wireless communication module 2252 or a long-range wireless communication module 2254, or a combination thereof. The communication module 2250 may include at least one antenna for wireless communication with another device.

The short-range wireless communication module 2252 may include, but not limited to, a Bluetooth communication module, a Bluetooth Low Energy (BLE) communication module, a near field communication (NFC) module, a wireless local area network (WLAN) (Wireless Fidelity (WiFi)) communication module, a ZigBee communication module, an infrared Data Association (IrDA) communication module, a WiFi Direct (WFD) communication module, an ultra-wideband (UWB) communication module, an Ant+ communication module, a microwave (uWave) communication module, etc.

The long-range wireless communication module 2254 may include a communication module performing various types of long-range communication, and may include a mobile communication module. The mobile communication module may transmit and receive a radio signal to and from at least one of a base station, an external terminal, or a server over a mobile communication network. Herein, the radio signal may include various forms of data corresponding to transmission/reception of a voice call signal, a video communication call signal, or a text/multimedia message.

The home appliance function module 2260 may include an operation module that performs the original function of the home appliance 2200. When the home appliance 2200 is a laundry machine, the home appliance function module 2260 may include a washing module. The washing module may include a washing tube, a water supply unit, a motor, a door, a detergent inlet, and the like. When the home appliance 2200 is a refrigerator, the home appliance function module 2260 may include a refrigerating/freezing module. The refrigerating/freezing module may include a container, a cooler, a door, a temperature sensor, etc. When the home appliance 2200 is a drying machine, the home appliance function module 2260 may include a drying module. The drying module may include a laundry container, a motor, a dehumidifying unit, a drain unit, a door, a dust filter, a condenser, and the like. When the home appliance 2200 is a cleaning machine, the home appliance function module 2260 may include a cleaning module. The cleaning module may include a vacuum suction unit, a dust bin, a filter, a dust transfer pipe, and so forth.

The processor 2290 may control an overall operation of the home appliance 2200. The processor 2290 may control components of the home appliance 2200 by executing a program stored in the memory 2240.

According to an embodiment of the disclosure, the processor 2290 may include a separate network processing unit (NPU) that performs a machine learning model. The processor 2290 may also include a central processing unit (CPU), a graphic processing unit (GPU), etc.

Figure 23:
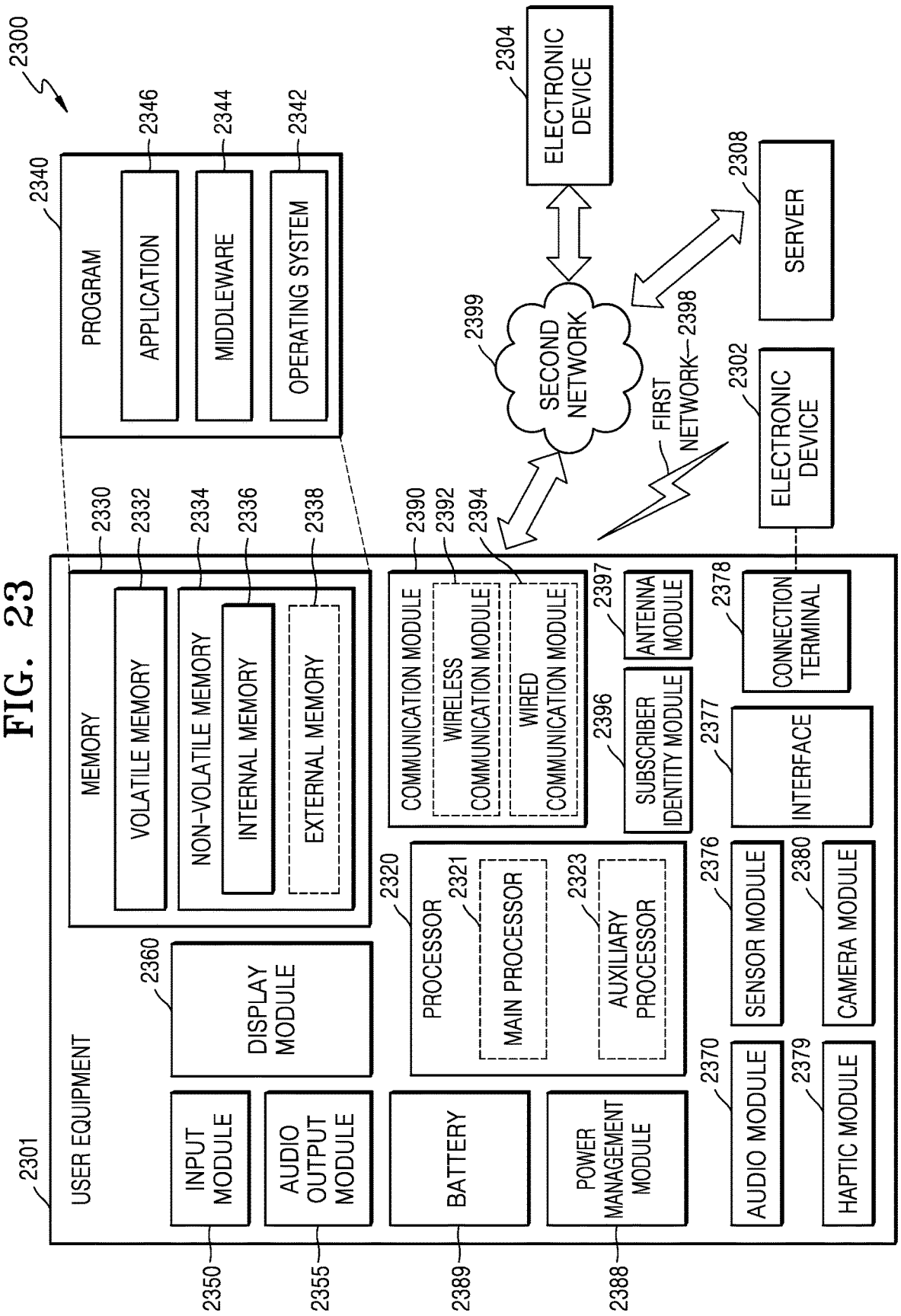
FIG. 23 is a block diagram illustrating a structure of a user equipment in a network environment, according to various embodiments of the disclosure.

FIG. 23 is a block diagram illustrating a structure of a user equipment 2301 in a network environment 2300, according to various embodiments of the disclosure.

The user equipment 2301 of FIG. 23 may correspond to the user equipment 130 described above. The processor 310 described with reference to FIG. 3 may correspond to a processor 2320, and the communication module 312 described with reference to FIG. 3 may correspond to a communication module 2390. The memory 316 described with reference to FIG. 3 may correspond to a memory 2330, and the input/output interface 318 described with reference to FIG. 3 may correspond to an input module 2350, an audio output module 2355, a display module 2360, an audio module 2370, and a haptic module 2379. The first home appliance 120 and the second home appliance 140 may correspond to an electronic device 2302 or an electronic device 2304.

Referring to FIG. 23, in the network environment 2300, the user equipment 2301 may communicate with the electronic device 2302 via a first network 2398 (e.g., a short-range wireless communication network), or may communicate with at least one of the electronic device 2304 or a server 2308 via a second network 2399 (e.g., a long-range wireless communication network). According to an embodiment of the disclosure, the user equipment 2301 may communicate with the electronic device 2304 via the server 2308. According to an embodiment of the disclosure, the user equipment 2301 may include a processor 2320, a memory 2330, an input module 2350, an audio output module 2355, a display module 2360, an audio module 2370, a sensor module 2376, an interface 2377, a connection terminal 2378, a haptic module 2379, a camera module 2380, a power management module 2388, a battery 2389, a communication module 2390, a subscriber identification module 2396, or an antenna module 2397. In some embodiments of the disclosure, at least one (e.g., the connection terminal 2378) of the components may be omitted from or one or more other components to the user equipment 2301. In some embodiments of the disclosure, some of the components (e.g., the sensor module 2376, the camera module 2380, or the antenna module 2397) may be integrated into one component (e.g., the display module 2360).

The processor 2320 may control at least one another component (e.g., a hardware or software component) of the user equipment 2301 connected to the processor 2320 by executing software (e.g., the program 2340), and may perform various data processing or operations. According to an embodiment of the disclosure, the processor 2320 as at least a part of data processing or operations may store a command or data received from another component (e.g., the sensor module 2376 or the communication module 290) in the volatile memory 2332, process the command or data stored in the volatile memory 2332, and store resulting data in the non-volatile memory 2334. According to an embodiment of the disclosure, the processor 2320 may include a main processor 2321 (e.g., a CPU or an application processor) or an auxiliary processor 2323 (e.g., a GPU, an NPU, an image signal processor (ISP), a sensor hub processor, or a communication processor) capable of operating independently of or together with the main processor 2321. For example, when the user equipment 2301 includes the main processor 2321 and the auxiliary processor 2323, the auxiliary processor 2323 may use lower power than the main processor 2321 or may be configured to be specialized for a specific function. The auxiliary processor 2323 may be implemented separately from or as a part of the main processor 2321.

The auxiliary processor 2323 may control at least some of functions or states related to at least one (e.g., the display module 2360, the sensor module 2376, or the communication module 2390) of the components of the user equipment 2301, in place of the main processor 2321 in an inactive (e.g., sleep) state of the main processor 2321 or together with the main processor 2321 in an active (e.g., application execution) state of the main processor 2321. According to an embodiment of the disclosure, the auxiliary processor 2323 (e.g., the image signal processor or the communication processor) may be implemented as a part of another component (e.g., the camera module 2380 or the communication module 2390) functionally related thereto. According to an embodiment of the disclosure, the auxiliary processor 2323 (e.g., the NPU) may include a hardware structure specialized for processing an AI model. The AI model may be generated through machine learning. Such learning may be performed by the user equipment 2301 that executes the AI model, or through a separate server (e.g., the server 2308). Examples of a learning algorithm may include, but is not limited to, for example, supervised learning, unsupervised learning, semi-supervised learning, or reinforcement learning. The AI model may include a plurality of artificial neural network layers. The artificial neural network may be, but is not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof. The AI model may additionally or alternatively include a software structure as well as the hardware structure.

The memory 2330 may store various data used by at least one component (e.g., the processor 2320 or the sensor module 2376). Data may include input data or output data regarding, for example, software (e.g., the program 2340) and a command related thereto. The memory 2330 may include the volatile memory 2332 or the non-volatile memory 2334.

The program 2340 may be stored as software in the memory 2330, and may include an operating system 2342, middleware 2344, or an application 2346.

The input module 2350 may receive commands or data to be used in a component (e.g., the processor 2320) of the user equipment 2301 from the outside (e.g., a user) of the user equipment 2301. The input module 2350 may include, for example, a microphone, a mouse, a keyboard, a key (e.g., a button), or a digital pen (e.g., a stylus pen).

The audio output module 2355 may output an audio signal to the outside of the user equipment 2301. The audio output module 2355 may include, for example, a speaker or a receiver. The speaker may be used for a general purpose such as multimedia reproduction or record play. The receiver may be used to receive an incoming call. According to an embodiment of the disclosure, the receiver may be implemented separately from or as a part of the speaker.

The display module 2360 may visually provide information to the outside (e.g., the user) of the user equipment 2301. The display module 2360 may include, for example, a display, a hologram display device, or a projector, and a control circuit for controlling the corresponding device. According to an embodiment of the disclosure, the display module 2360 may include a touch sensor configured to detect a touch or a pressure sensor configured to measure a strength of a force generated by the touch.

The audio module 2370 may convert sound into an electrical signal or convert an electrical signal into sound. According to an embodiment of the disclosure, the audio module 2370 may obtain sound through the input module 2350 or output sound through an external electronic device (e.g., the electronic device 2302, for example, a speaker or a headphone) directly or wirelessly connected to the audio output module 2355 or the user equipment 2301.

The sensor module 2376 may sense an operating state (e.g., power or a temperature) of the user equipment 2301, or an outer environmental state (e.g., a user state), and may generate an electrical signal or a data value corresponding to the sensed state. According to an embodiment of the disclosure, the sensor module 2376 may include, e.g., a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more designated protocols that may be used in order for the user equipment 2301 (e.g., the electronic device 2302) to be directly or wirelessly connected to the external electronic device (e.g., the electronic device 2302). According to an embodiment of the disclosure, the interface 2377 may include, for example, a high-definition multimedia interface (HDMI), a universal serial bus (USB) interface, a secure digital (SD) card interface, or an audio interface.

The connection terminal 2378 may include a connector through which the user equipment 2301 may be physically connected to the external electronic device (e.g., the electronic device 2302). According to an embodiment of the disclosure, the connection terminal 2378 may include, for example, an HDMI connector, a USB connector, an SD card connector, or an audio connector (e.g., a headphone connector).

The haptic module 2379 may convert the electrical signal into a mechanical stimulation (e.g., vibration or motion) or an electric stimulation that the user may sense through a tactile or motion sensation. According to an embodiment of the disclosure, the haptic module 2379 may include, for example, a motor, a piezoelectric element, or an electric stimulation device.

The camera module 2380 may capture a still image and a moving image. According to an embodiment of the disclosure, the camera module 2380 may include one or more lenses, image sensors, image signal processors, or flashes.

The power management module 2388 may manage the power supplied to the user equipment 2301. According to an embodiment of the disclosure, the power management module 2388 may be implemented as at least a part of, for example, a power management integrated circuit (PMIC).

The battery 2389 may supply electric power to at least one component of the user equipment 2301. According to an embodiment of the disclosure, the battery 2389 may include, for example, a non-rechargeable primary battery, a rechargeable secondary battery, or a fuel cell.

The communication module 2390 may support establishment of a direct (wired) communication channel and a wireless communication channel between the user equipment 2301 and an external electronic device (e.g., the electronic device 2302, the electronic device 2304, or the server 2308), and execution of communication through the established communication channel. The communication module 2390 may operate independently of the processor 2320 (e.g., the application processor), and may include one or more communication processors that support direct (e.g., wired) communication or wireless communication. According to an embodiment of the disclosure, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). The communication module 2390 may communicate with the external electronic device 2304 through the first network 2398 (e.g., a short-range communication network such as Bluetooth, WiFi Direct or IrDA) or the second network 2399 (e.g., a long-range communication network such as a legacy cellular network, a 5th-Generation (5G) network, a next-generation communication network, Internet, or a computer network (e.g., a LAN or WAN)). Such various kinds of communication modules may be integrated as one component (e.g., a single chip) or may be implemented as a plurality of components (e.g., a plurality of chips) separately from one another. The wireless communication module 2392 may identify or authenticate the user equipment 2301 in a communication network such as the first network 2398 or the second network 2399 by using subscriber information (e.g., an international mobile subscriber identifier (IMSI)) stored in the subscriber identification module 2396.

The wireless communication module 2392 may support a 5G network and next-generation communication technology, e.g., new radio (NR) access technology, after a 4th-Generation (4G) network. The NR access technology may support high-speed transmission (enhanced mobile broadband (eMBB)) of high-volume data, terminal power minimization and access of multiple terminals (massive machine type communications (mMTC)), or high reliability and low latency (ultra-reliable and low-latency communications (URLLC)). The wireless communication module 2392 may support, for example, a high-frequency band (e.g., an mmWave band) to achieve a high data transmission rate. The wireless communication module 2392 may support various techniques for securing performance in the high-frequency band, e.g., beamforming, massive multiple-input and multiple-output (MIMO), full dimensional (FD)-MIMO, an array antenna, analog beamforming, or a large-scale antenna. The wireless communication module 2392 may support various requirements prescribed in the user equipment 2301, an external electronic device (e.g., the electronic device 2304), or a network system (e.g., the second network 2399). According to an embodiment of the disclosure, the wireless communication module 2392 may support a peak data rate (e.g., 20 Gbps or more) for eMBB implementation, a loss coverage (e.g., 164 dB or less) for mMTC implementation, or user-plane latency (e.g., 0.5 ms or less or a round trip of 1 ms or less for each of a downlink (DL) and an uplink (UL) for URLLC implementation.

The antenna module 2397 may transmit or receive a signal or power to or from outside (e.g., an external electronic device). According to an embodiment of the disclosure, the antenna module 2397 may include an antenna including a conductor formed on a substrate (e.g., a printed circuit board (PCB)) or a radiator having a conductive pattern. According to an embodiment of the disclosure, the antenna module 2397 may include a plurality of antennas (e.g., an array antenna). In this case, at least one antenna suitable for a communication scheme used in a communication network such as the first network 2398 or the second network 2399 may be selected from, for example, the plurality of antennas, by the communication module 2390. The signal or power may be transmitted or received between the communication module 2390 and the external electronic device through the selected at least one antenna. According to some embodiments of the disclosure, a component (e.g., a radio frequency integrated circuit (RFIC)) as well as the radiator may be additionally formed as a part of the antenna module 2397.

According to various embodiments of the disclosure, the antenna module 2397 may form an mmWave antenna module. According to an embodiment of the disclosure, the mmWave antenna module may include a PCB, an RFIC disposed on a first surface (e.g., a bottom surface) of the PCB or adjacent to the first surface and capable of supporting a designated high-frequency band (e.g., an mmWave band), and a plurality of antennas (e.g., an array antenna) disposed on a second surface (e.g., a top surface or a side surface) of the PCB or adjacent to the second surface and capable of transmitting or receiving a signal in the designated high-frequency band.

At least some of the components may be connected to one another via a communication scheme between peripheral devices (e.g., a bus, general purpose input and output (GPIO), a serial peripheral interface (SPI), or a mobile industry processor interface (MIPI)) and may exchange signals (e.g., a command or data).

According to an embodiment of the disclosure, a command or data may be transmitted or received between the user equipment 2301 and the external electronic device 2304 through the server 2308 connected to the second network 2399. Each of the external electronic devices 2302 and the 2304 may be of a type that is the same as or different from the user equipment 2301. According to an embodiment of the disclosure, all or some of operations performed in the user equipment 2301 may be performed in one or more of the external electronic devices 2302, 2304, and 2308. For example, when the user equipment 2301 has to perform a certain function or service automatically or in response to a request from the user or another device, the user equipment 2301 may request one or more external electronic devices to perform at least a part of the function or service, instead of performing the function or service. The one or more external electronic devices having received the request may execute at least a part of the requested function or service or an additional function or service related to the request, and transmit a result of execution to the user equipment 2301. The user equipment 2301 may intactly or additionally process the result and provide a result of the processing as at least a part of a response to the request. To this end, for example, cloud computing, distributed computing, mobile edge computing (MEC), or client-server computing may be used. The user equipment 2301 may provide an ultra-low latency service by using the distributed computing or the MEC. In another embodiment of the disclosure, the external electronic device 1604 may include an Internet of Things (IoT) device. The server 2308 may be an intelligent server using machine learning and/or a neural network. According to an embodiment of the disclosure, the external electronic device 2304 or the server 2308 may be included in the second network 2399. The user equipment 2301 may apply an intelligent service (e.g., a smart home, a smart city, a smart car, or health care) based on 5G communication technology and IoT-related technology.

A term "module" used in various embodiments of this document may include a unit implemented with hardware, software, or firmware, and may be mutually compatibly used with a term such as logic, a logic block, a part, or a circuit. The module may be a component configured as one piece or a minimum unit of the component, which performs one or more functions, or a part thereof. For example, according to an embodiment of the disclosure, the module may be implemented in the form of an application specific integrated circuit (ASIC).

Various embodiments of this document may be implemented as software (e.g., a program) including one or more instructions stored in a storage medium readable by a machine (e.g., the user equipment 130, the first home appliance 120, or the second home appliance 140). For example, a processor of a machine (e.g., the user equipment 130, the first home appliance 120, or the second home appliance 140) may call at least one of the one or more stored instructions from the storage medium and execute the instruction. This may enable the machine to operate to perform at least one function according to the at least one called instruction. The one or more instructions may include a code generated by a compiler or a code executable by an interpreter. A machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. In the case of online distribution, at least a part of a computer program product may be at least temporarily stored in a machine-readable storage medium such as a memory of a server of a manufacturer, a server of an application store, or a relay server, or may be generated temporarily.

According to various embodiments of the disclosure, each of the above-described components (e.g., a module or program) may include a single entity or a plurality of entities, some of which may be separately disposed on other components. According to various embodiments of the disclosure, one or more of the above-described components or operations may be omitted or one or more other components or operations may be added. Alternatively or additionally, a plurality of components (e.g., modules or programs) may be integrated into one component. In this case, the integrated component may perform one or more functions of each of the plurality of components in a manner that is the same as or similar to a corresponding component of the plurality of components before the integration. According to various embodiments of the disclosure, operations performed by a module, a program, or other components may be executed sequentially, in parallel, repeatedly, or heuristically, or one or more of the operations may be executed in a different order or omitted, or one or more other operations may be added.

What is claimed is:

1. A method, performed by a server device, of controlling a home appliance, the method comprising:
    receiving a distance measurement request signal from a user equipment;
    transmitting, based on the received distance measurement request signal, an ultra-wideband (UWB) communication module activation signal to the user equipment and a second home appliance that includes a UWB antenna;
    receiving, from the second home appliance, a location measurement value of the user equipment measured with respect to the second home appliance, the location measurement value being based on a UWB signal between the user equipment and the second home appliance;
    determining location information about the user equipment, based on the location measurement value of the user equipment;
    receiving, from a first home appliance that does not include a UWB antenna, information about the first home appliance; and
    registering the first home appliance in the server device, based on the received information about the first home appliance and the location information about the user equipment.

2. The method of claim 1, further comprising identifying, based on the received distance measurement request signal, the second home appliance as an appliance including the UWB antenna and being registered in the server device.

3. The method of claim 1, wherein the distance measurement request signal is transmitted from the user equipment to the server device based on a selection of a quick response (QR) capturing menu or a near field communication (NFC) tagging menu on a device registration graphical user interface (GUI) displayed on the user equipment to register the first home appliance.

4. The method of claim 1, wherein the receiving the location measurement value of the user equipment comprises receiving location information about the user equipment measured with respect to the second home appliance based on a location identification request signal, and
    wherein the location identification request signal is a UWB signal transmitted from the user equipment to the second home appliance based on selection of a QR capturing button of the user equipment or performing NFC tagging with the user equipment.

5. The method of claim 1, wherein the location measurement value comprises azimuth information about the user equipment, measured with respect to the second home appliance, elevation information about the user equipment, measured with respect to the second home appliance, and distance information between the second home appliance and the user equipment.

6. The method of claim 1, wherein the determining the location information about the user equipment comprises determining the location information about the user equipment based on a comparison of information in a location information lookup table stored in the server device with the location measurement value of the user equipment.

7. The method of claim 1, wherein the receiving the information about the first home appliance comprises receiving, based on access point (AP) information received by the first home appliance from the user equipment, the information about the first home appliance from the first home appliance through a Wireless Fidelity (WiFi) communication channel established between the user equipment and the first home appliance.

8. The method of claim 7, wherein the information about the first home appliance comprises a product name of the first home appliance, a manufacturing date of the first home appliance, and state information about the first home appliance.

9. The method of claim 1, further comprising:
    receiving a control graphical user interface (GUI) request signal from the user equipment;
    based on the received control GUI request signal, transmitting the UWB communication module activation signal to the user equipment and the second home appliance;
    receiving, from the second home appliance, the location measurement value of the user equipment measured in response to the location identification request signal transmitted from the user equipment;
    determining a third home appliance toward which the user equipment is oriented, based on the location measurement value of the user equipment; and
    providing a GUI for controlling the determined third home appliance to the user equipment.

10. A server device comprising:
    a communication interface configured to communicate with a user equipment and at least one home appliance;
    a memory storing one or more instructions; and
    at least one processor configured to execute the one or more instructions to:
        receive, via the communication interface, a distance measurement request signal from a user equipment;
        control the communication interface to transmit, based on the received distance measurement request signal, an ultra-wideband (UWB) communication module activation signal to the user equipment and a second home appliance that includes a UWB antenna;

receive, from the second home appliance via the communication interface, a location measurement value of the user equipment measured with respect to the second home appliance, the location measurement value being based on a UWB signal between the user equipment and the second home appliance;

determine location information about the user equipment, based on the location measurement value of the user equipment;

receive, from a first home appliance that does not include a UWB antenna, information about the first home appliance; and register the first home appliance in the server device, based on the received information about the first home appliance and the location information about the user equipment.

11. The server device of claim 10, wherein the at least one processor is further configured to execute the one or more instructions to identify, based on the received distance measurement request signal, the second home appliance as an appliance including the UWB antenna and being registered in the server device.

12. The server device of claim 10, wherein the distance measurement request signal is transmitted from the user equipment to the server device, based on a selection of a quick response (QR) capturing menu or a near field communication (NFC) tagging menu on a device registration graphical user interface (GUI) displayed on the user equipment to register the first home appliance.

13. The server device of claim 10, wherein the at least one processor is further configured to execute the one or more instructions to receive the location measurement value of the user equipment by receiving location information about the user equipment measured with respect to the second home appliance based on a location identification request signal, and wherein the location identification request signal is a UWB signal transmitted from the user equipment to the second home appliance based on selecting selection of a QR capturing button of the user equipment or performing NFC tagging with the user equipment.

14. The server device of claim 10, wherein the location measurement value comprises azimuth information about the user equipment, measured with respect to the second home appliance, elevation information about the user equipment, measured with respect to the second home appliance, and distance information between the second home appliance and the user equipment.

15. The server device of claim 10, wherein the at least one processor is further configured to execute the one or more instructions to determine the location information about the user equipment based on a comparison of information in a location information lookup table stored in the server device with the location measurement value of the user equipment.

16. The server device of claim 10, wherein the at least one processor is further configured to execute the one or more instructions to receive the information about the first home appliance by receiving, based on access point (AP) information received by the first home appliance from the user equipment, the information about the first home appliance from the first home appliance through a Wireless Fidelity (WiFi) communication channel established between the user equipment and the first home appliance.

17. The server device of claim 16, wherein the information about the first home appliance comprises a product name of the first home appliance, a manufacturing date of the first home appliance, and state information about the first home appliance.

18. The server device of claim 10, wherein the at least one processor is further configured to execute the one or more instructions to:

receive, via the communication interface, a control graphical user interface (GUI) request signal from the user equipment;

control the communication interface to transmit the UWB communication module activation signal to the user equipment and the second home appliance, based on the received control GUI request signal;

receive, from the second home appliance via the communication interface, the location measurement value of the user equipment measured in response to a location identification request signal transmitted from the user equipment;

determine a third home appliance toward which the user equipment is oriented, based on the location measurement value of the user equipment; and control the communication interface to provide a graphical user interface (GUI) for controlling the determined third home appliance to the user equipment.

19. A non-transitory computer-readable recording medium having recorded thereon a computer program that is executable by a computer to perform the method of claim 1.

20. A method of controlling a user equipment, the method comprising:

receiving a user input to select a quick response (QR) capturing menu or a near field communication (NFC) tagging menu on a device registration graphical user interface (GUI) displayed on the user equipment;

transmitting a distance measurement request signal to a server device, based on the received user input;

transmitting a location identification request signal, to a second home appliance identified by the server device as registered and including a UWB antenna, based on a user of the user equipment selecting a QR capturing button of the user equipment or performing NFC tagging with the user equipment;

receiving a user input to input access point (AP) information in the device registration GUI displayed on the user equipment; and transmitting the received AP information to a first home appliance identified by a QR capture or an NFC tag.

* * * * *